(12) United States Patent
Bomleny et al.

(10) Patent No.: US 9,072,222 B2
(45) Date of Patent: Jul. 7, 2015

(54) SELF-CENTERING COVER FOR HINGED ROW CROP HARVESTING HEAD

(71) Applicant: DEERE & COMPANY, Moline, IL (US)

(72) Inventors: Duane M Bomleny, Geneseo, IL (US); Michael L Vandeven, Princeton, IA (US); Douglas Van Meter, Raleigh, NC (US); Nathan E Krehbiel, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 125 days.

(21) Appl. No.: 14/025,278

(22) Filed: Sep. 12, 2013

(65) Prior Publication Data

US 2014/0075909 A1 Mar. 20, 2014

Related U.S. Application Data

(60) Provisional application No. 61/703,745, filed on Sep. 20, 2012.

(51) Int. Cl.
*A01D 45/00* (2006.01)
*A01D 45/02* (2006.01)
*A01D 41/14* (2006.01)

(52) U.S. Cl.
CPC .......... *A01D 45/021* (2013.01); *A01D 41/144* (2013.01)

(58) Field of Classification Search
CPC ... A01D 41/14; A01D 41/141; A01D 41/144; A01D 41/16; A01D 45/021; A01D 57/20
USPC .......... 56/119, 208, 219–221, 228, 311, 332, 56/14.7, 15.2, 85, 94, 97; 460/114
See application file for complete search history.

(56) References Cited

U.S. PATENT DOCUMENTS

| | | | | |
|---|---|---|---|---|
| 3,345,808 | A | * 10/1967 | Van Der Lely | 56/10.2 R |
| 5,673,543 | A | 10/1997 | Richardson et al. | |
| 5,724,798 | A | 3/1998 | Stefl et al. | |
| 5,960,618 | A | * 10/1999 | Kerber | 56/119 |
| 7,191,582 | B2 | * 3/2007 | Bomleny | 56/10.2 E |
| 8,635,842 | B2 | * 1/2014 | Markt | 56/15.2 |
| 2008/0072560 | A1 | * 3/2008 | Talbot | 56/208 |
| 2008/0295473 | A1 | * 12/2008 | Tippery et al. | 56/14.5 |

FOREIGN PATENT DOCUMENTS

| | | |
|---|---|---|
| RU | 2191497 C1 | 10/2002 |
| SU | 1605991 A1 | 11/1990 |

OTHER PUBLICATIONS

Eurasian Search Report in counterpart application No. 201300936, dated Feb. 13, 2014 (2 pages).

* cited by examiner

*Primary Examiner* — Robert Pezzuto

(57) ABSTRACT

A self-centering cover assembly for hinged row crop harvesting head comprises a cover supported on a base member, wherein the base member is positioned by springs to self-center with respect to two hinged sections of the harvesting head.

13 Claims, 20 Drawing Sheets

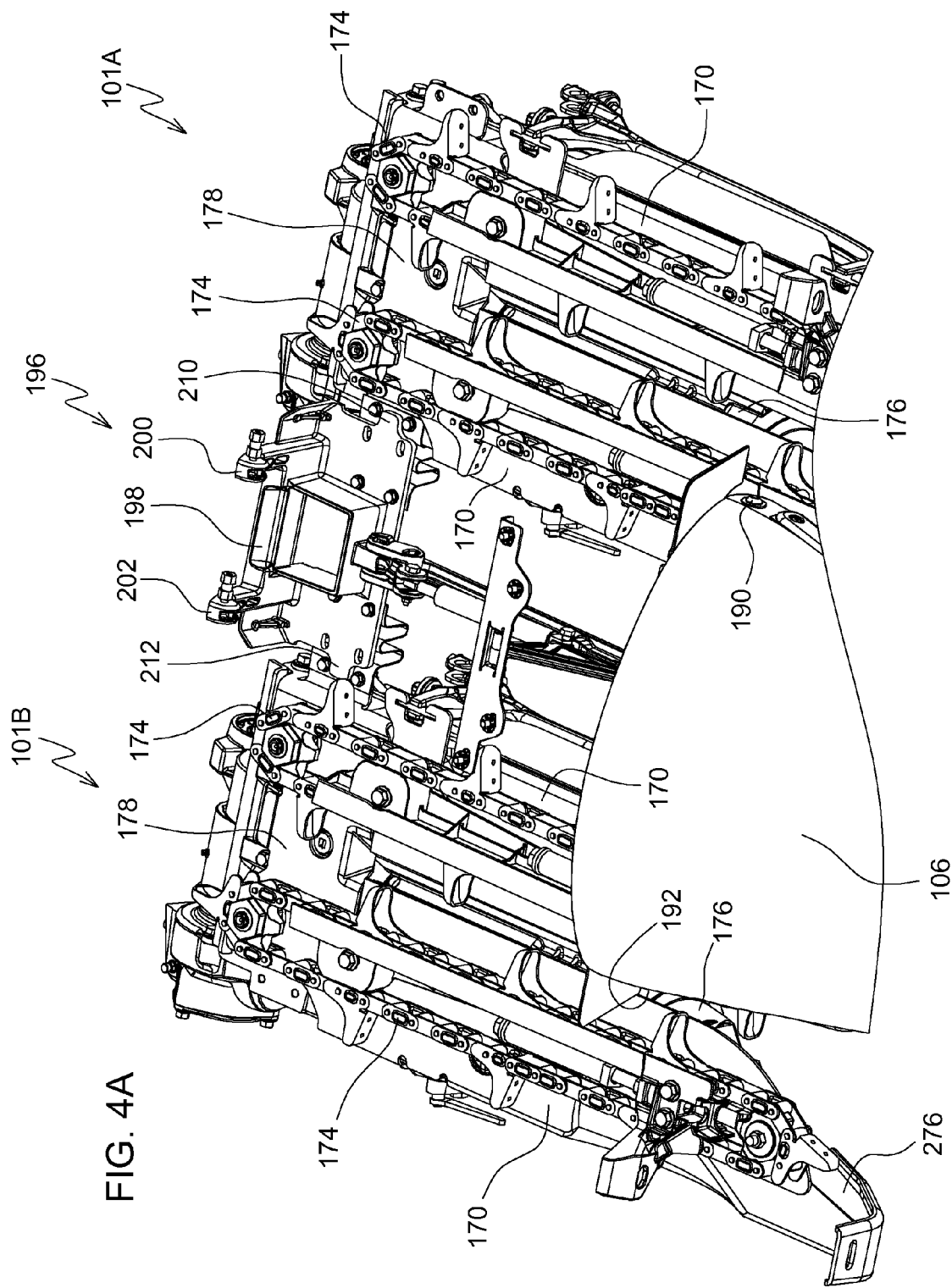

SELF-CENTERING COVER FOR HINGED ROW CROP HARVESTING HEAD

RELATED APPLICATIONS

This application is related to and claims priority from U.S. Provisional Patent Application 61/703,745, which was filed Sep. 20, 2012. This application is related to U.S. Provisional Patent Applications Nos. 61/703,752 and 61/703,740 which were also filed on Sep. 20, 2012.

FIELD OF THE INVENTION

This invention relates to row crop harvesting heads. More particularly, it relates to covers for row crop harvesting heads.

BACKGROUND OF THE INVENTION

Row crop harvesting heads such as corn heads are being manufactured in ever increasing widths. Combine harvesters are made larger and more powerful and capable of carrying larger harvesting heads.

One problem with these larger harvesting heads is their inability to properly harvest crops planted on undulating terrain. The longer harvesting heads become, the harder it is for them to conform to the surface of the field.

What is needed, therefore, is an improved row crop harvesting head for a combine harvester that is capable of following undulating terrain in an agricultural field more accurately and capable of harvesting crop more efficiently with fewer problems of crop fouling or crop damage.

It is an object of this invention to provide such a row crop harvesting head.

SUMMARY OF THE INVENTION

In accordance with one aspect of the invention, a self-centering cover assembly for row units of a hinged row crop harvesting head, the hinged row crop harvesting head having a first frame section and a second frame section pivotally coupled together, wherein the self-centering cover assembly comprises: a base member; a cover coupled to the base member; a first spring coupled between the first frame section and the base member; and a second spring coupled between the second frame section and the base member; wherein the first spring and the second spring are disposed to reposition the cover with respect to both the first frame section and the second frame section when the first frame section and the second frame section pivot with respect to each other.

The first spring may be coupled to a first row unit on the first frame section, and the second spring may be coupled to a second row unit immediately adjacent to the first row unit, and the second row unit may be mounted on the second frame section.

The base member may further comprise guide members that constrain the base member to slide laterally with respect to the first frame section and the second frame section when the first frame section and the second frame section pivot with respect to each other.

The guide members may be disposed on opposite sides of the base member.

The first spring and the second spring may be serpentine.

The first spring and the second spring may be disposed to extend and retract in a direction generally parallel to a longitudinal extent of the hinged row crop harvesting head.

The first spring and the second spring may be fixed to opposite lateral sides of the base member.

The base member may be coupled to the cover by a hinge, and the hinge may constrain the cover to pivot with respect to the base member about a laterally extending axis.

The hinge may be disposed above the first spring and the second spring.

The hinge may be disposed behind the first spring and the second spring.

The base member may be disposed immediately above a pivot axis about which pivot axis the first frame section, is constrained to pivot with respect to the second frame section.

The first spring may be disposed on one side of the pivot axis, and the second spring may be disposed on the other side of the pivot axis.

The first spring and the second spring may be disposed above the pivot axis.

BRIEF DESCRIPTION OF THE DRAWINGS

FIG. 4A is a fragmentary elevated left side perspective view of the left half of the corn head of FIG. 1 showing two adjacent row units and a point of FIG. 2 and with the other elements removed.

DETAILED DESCRIPTION

Figure 1:
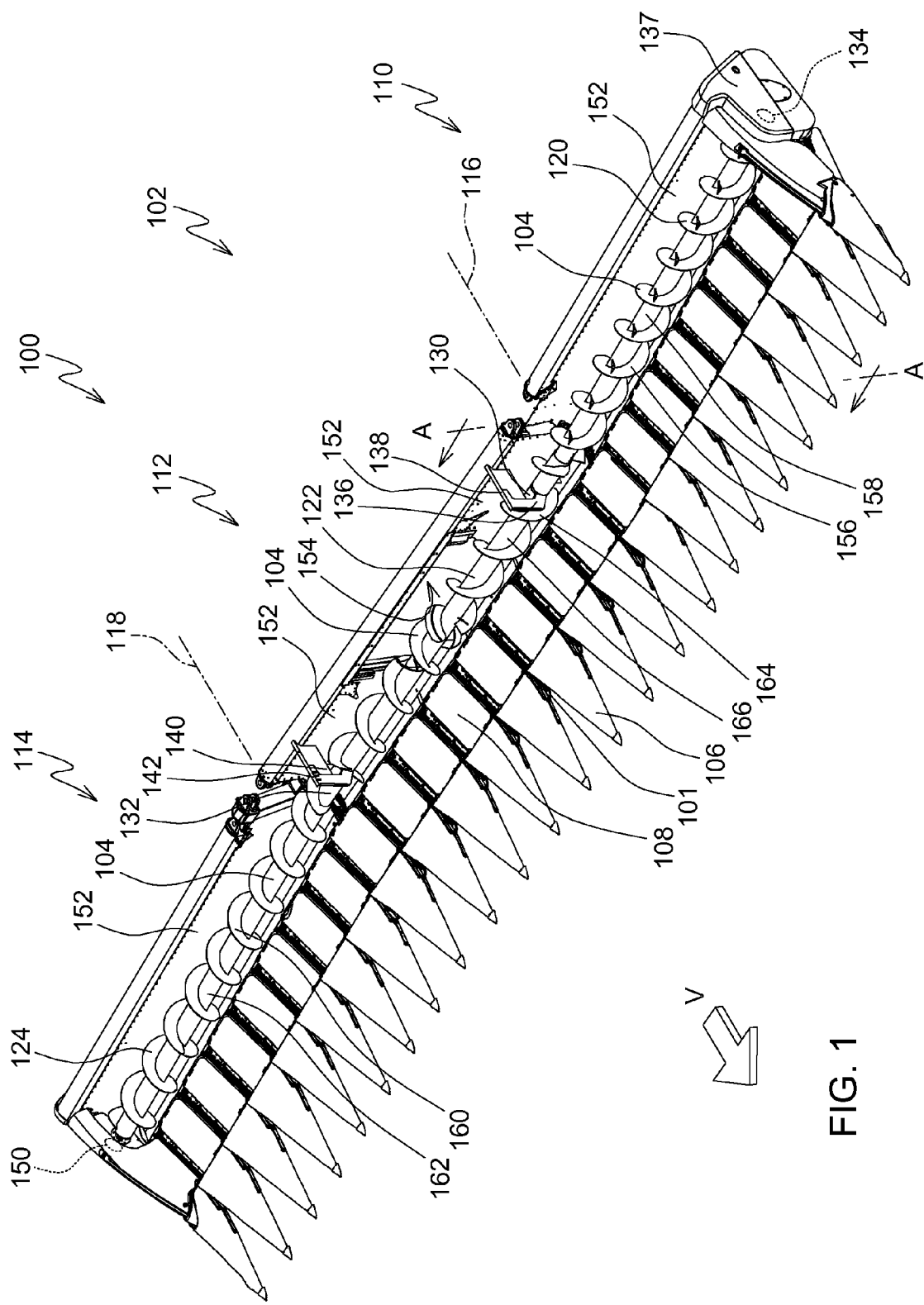
FIG. 1 is an elevated left side perspective view of a corn head in accordance with the present invention.
Figure 2:
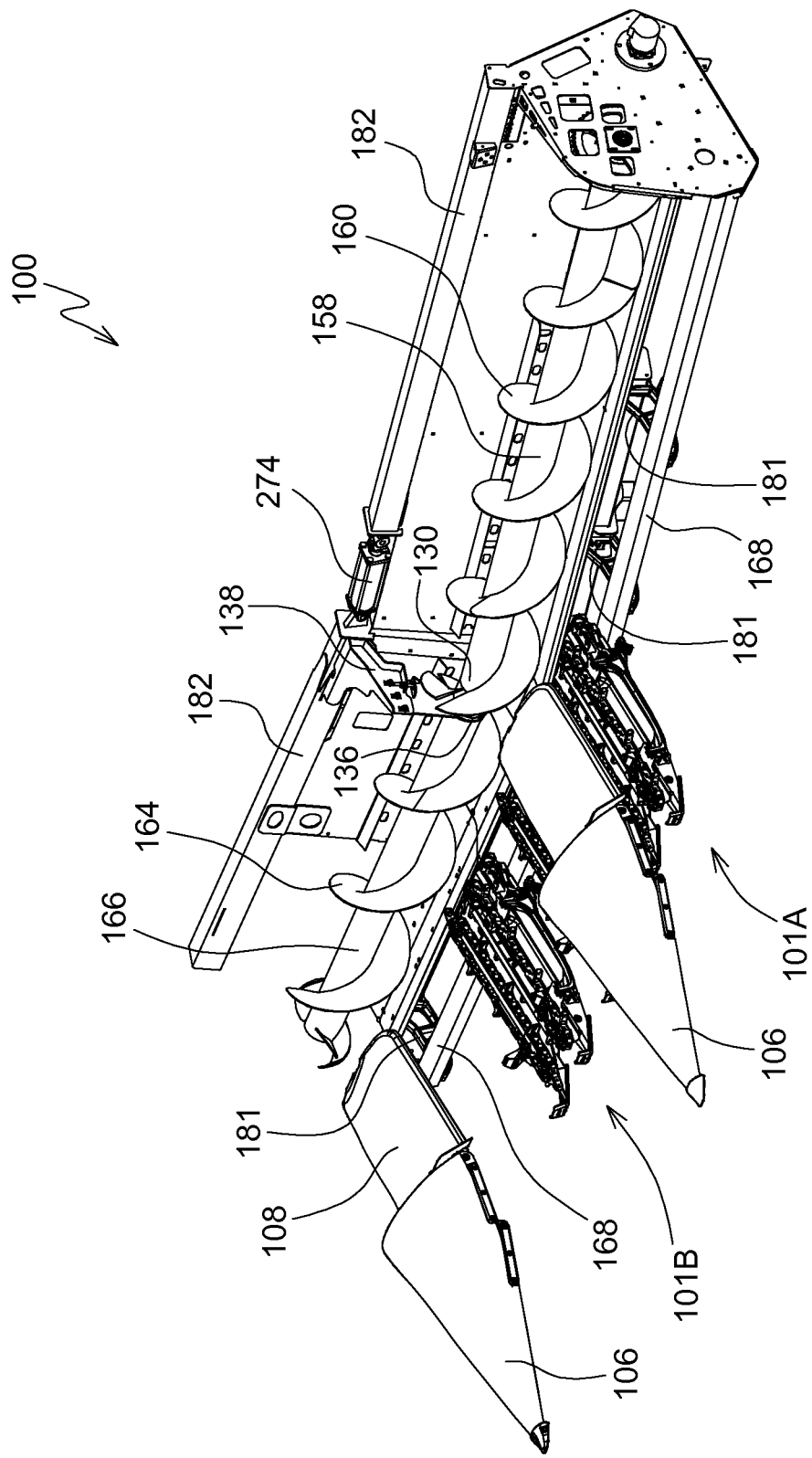
FIG. 2 is a fragmentary elevated left side perspective view of the left half of the corn head of FIG. 1.
Figure 3:
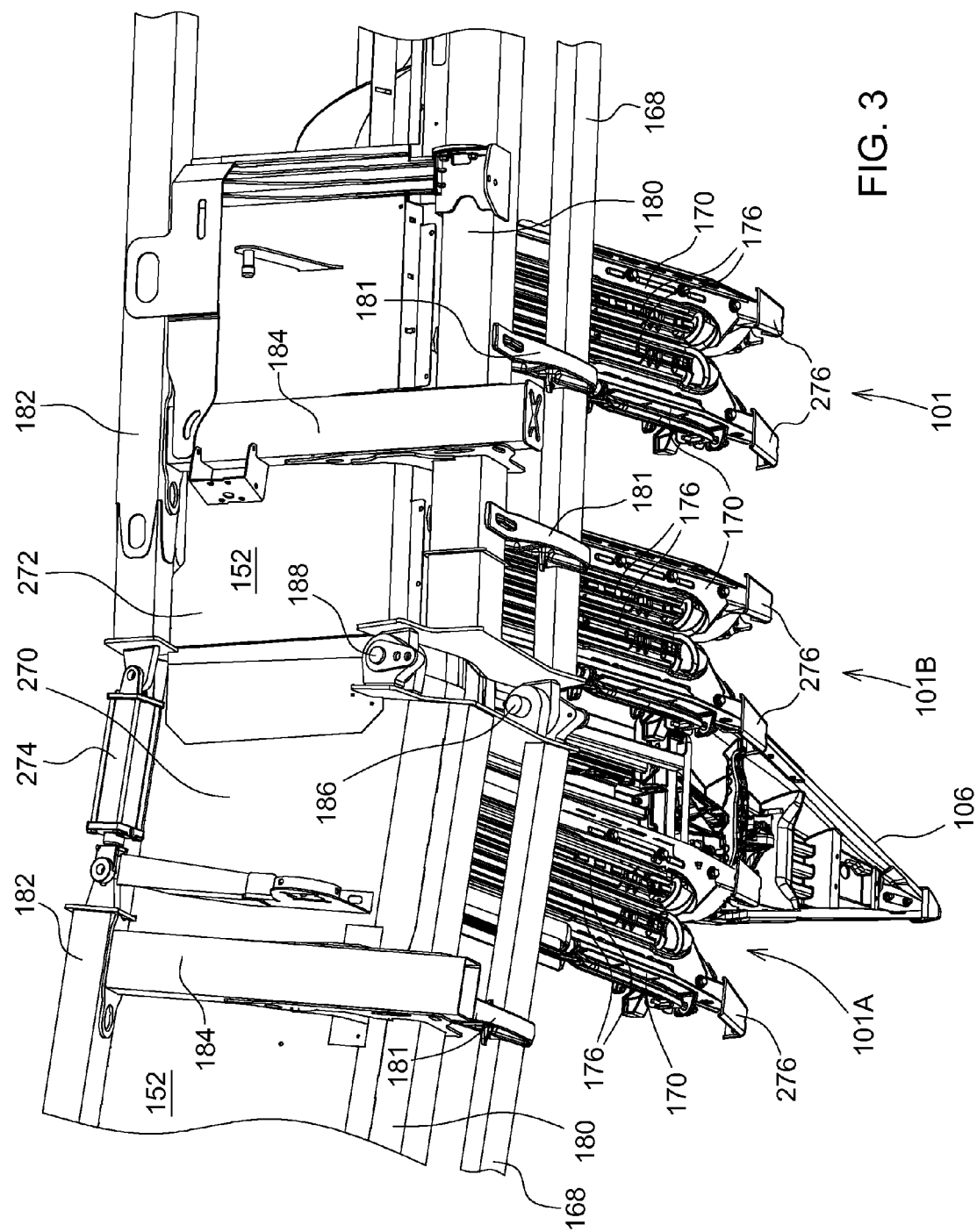
FIG. 3 is a depressed rear perspective view of the fragmentary view of FIG. 2.

Referring to FIG. 1, a corn head 100 is shown having a frame 102 that extends laterally and generally perpendicular to the direction of travel "V" of the corn head as it travels through the field harvesting crop.

Corn head 100 further comprises a conveyor 104 that extends substantially the entire longitudinal extent of the corn head 100 and generally perpendicular to the direction of travel of travel "V".

Corn head 100 further comprises a plurality of row units 101 fixed to frame 102 and extending forward therefrom. In FIG. 1, these row units are covered by corresponding points 106 and covers 108 disposed behind the points 106 that serve to divide the crop into individual rows and feed the crop into the gap between the arms 170 of adjacent row units 101. These row units 101 are seen in greater detail in FIGS. 2-7.

Frame 102 comprises three laterally extending frame sections 110, 112, 114 that are pivotally coupled together to permit the three frame sections to pivot up and down with respect to each other about a pivot axis 116 and a pivot axis 118 that extend generally parallel to the ground and parallel to the direction of travel "V".

Frame 102 comprises a left frame section 110, a center frame section 112, and a right frame section 114. The left frame section 110 is pivotally coupled to the center frame section 112 to constrain the two frame sections to pivot with respect to each other about the pivot axis 116. The pivot axis 116 extends generally fore-and-aft and parallel to the direction of travel "V". Right frame section 114 is pivotally coupled the center frame section 112 to constrain the two frame sections to pivot with respect to each other about the pivot axis 118. The pivot axis 118 extends generally fore-and-aft and parallel to the direction of travel "V". The pivot axis 116 is parallel to the pivot axis 118.

Conveyor 104 is an auger conveyor; it is comprised of three elongate conveyor sections that extend horizontally and perpendicular to the direction of travel "V".

The three conveyor sections comprise a left conveyor section 120, a center conveyor section 122, and a right conveyor section 124. The conveyor 104 is driven in rotation by at least one motor (not shown). Each of the conveyor sections 120, 122, 124 is comprised of an elongate tube to which a spiral flight is welded. The right (inner) end of the left conveyor section 120 and the left end of the center conveyor section 122 are coupled together with a universal joint 130. The left (inner) end of the right conveyor section 124 and the right end of the center conveyor section 122 are coupled together with a universal joint 132. Universal joints are preferred because they permit the conveyor sections to synchronously rotate about their longitudinal axes being driven by motor at one or both ends, while being disposed at an angle with respect to each other as each of the frame sections pivots with respect to each other about the pivot axis 116 and the pivot axis 118.

The left conveyor section 120 is supported on a bearing 134 located at an outer end of the left conveyor section 120. The bearing 134 is fixed to the left frame section 110. The bearing 134 supports the outer end of the left conveyor section 120 for rotation. The bearing 134 also permits the outer end of the left conveyor section 120 to translate with respect to an end wall 137 of the left frame section 110 in a direction parallel to a longitudinal axis of the left conveyor section 120.

As the left frame section 110 pivots downward with respect to center frame section 112 about the pivot axis 116, the bearing 134 supports the left conveyor section 120 for rotation, but also permits the left conveyor section 120 to translate along its rotational axis to the right with respect to the left frame section 110.

Likewise, as the left frame section pivots upward with respect to the center frame section 112 about the pivot axis 116, the bearing 134 permits the left conveyor section 120 to translate along its rotational axis to the left with respect to the left frame section 110.

The translating support provided by the bearing 134 to the outer end of the left conveyor section 120 therefore eliminates axial stress on the universal joint 130 as the left frame section 110 pivots up and down.

The center conveyor section 122 is supported at its left end on a bearing 136. The bearing 136 is supported on a bracket 138 that is fixed to and extends forward from the left end of the center frame section 112. The center conveyor section 122 is supported at its right end on a bearing 140. The bearing 140 is supported on a bracket 142 that is fixed to and extends forward from the right end of the center frame section 112. The right conveyor section 124 is supported on a bearing 150 that supports the outer end of the right conveyor section 124 for rotation. Bearing 150 is the counterpart of bearing 134 on the other side of the corn head 100.

Corn head 100 further comprises a generally vertical rear wall 152 that extends substantially the entire width of the corn head 100. The center conveyor section 122 provides an aperture 154 in the rear wall 152 to permit the corn head 100 to be supported on a feeder house (not shown) of a combine harvester.

All of the conveyor sections rotate in the same direction. However, due to the different angles of the auger flights, crop is moved in different directions as the conveyor sections rotate. An auger flight 156 that is fixed to an elongate tube 158 of the left conveyor section 120 conveys crop inwardly toward the center of the corn head 100 from left to right. An auger flight 160 that is fixed to an elongate tube 162 of the right conveyor section 124 conveys crop inwardly toward the center of the corn head 100 from right to left. An auger flight 164 is fixed to an elongate tube 166 of the center conveyor section 122 and has two sets of auger flights with opposite twists such that auger flights at opposing ends of the center conveyor section 122 convey crop in opposite directions toward the middle of the center conveyor section 122.

Each of the three frame sections 110, 112, 114 can pivot generally vertically, both up and down, with respect to its adjacent frame section.

The frame sections 110, 114 on the ends of the corn head 100 can pivot upward with respect to the center frame section 112 as shown by the left frame section 110, which is pivoted upward with respect to the center frame section 112 in FIG. 1.

Likewise each frame section can pivot downward with respect to its adjacent frame section as shown by the right frame section 114 which is pivoted downward with respect to the center frame section 112. The left frame section 110 and the right frame section 114 can pivot upward 10° above the center frame section 112. The left and right frames sections can pivot downward 10° below the center frame section 112.

From here onward in this disclosure, we will only discuss the left half of the corn head 100. We are doing this for economy of illustration. The corn head itself is symmetric about a vertical and fore-and-aft plane extending through the center of the aperture 154. Any explanations made below regarding the operation or construction of the left half of the corn head 100 are equally applicable to the right half of the corn head 100, since the left and half and right half are the same, with one difference: the right half of the corn head 100 is constructed in mirror image form to the left half of the corn head 100.

Referring to FIGS. 2-7, the left half of the corn head 100 is shown with several of the points 106 and the covers 108 as well as several row units 101 removed in order to illustrate the relation between the points and covers and row units, as well as the frame members that support these portions of the corn head 100. Two of the row units 101, identified below as 101A and 101B, are disposed immediately adjacent to each other on opposite sides of the pivot axis 116. They are identical in all respects to the other 22 row units of corn head 100 that are not all individually illustrated in this document.

The left frame section 110 and the center frame section 112 each comprise an elongate toolbar 168 to which row units 101 are attached. The elongate toolbars 168 extend generally perpendicular to the direction of travel "V" and extend parallel to the ground. Each of the row units 101 includes two forwardly extending arms 170 that are mounted on and extend forward from a row unit gearbox 178. A gathering chain 174 is disposed on top of each of the arms 170. Each row unit 101 has two stalk rolls 176, with each stalk roll 176 disposed side by side, partially underneath and between each of the arms 170.

The stalk rolls extend forward from and are driven in rotation by the row unit gearbox 178 disposed at the rear of the row unit 101. The row unit gearbox 178 is fixed to the elongate toolbar 168 and the arms 170, the gathering chains 174, and the stalk rolls 176 are cantilevered forward from the row unit gearbox 178 and the elongate toolbar 168.

The left frame section 110 and the center frame section 112 include elongate frame members 180 disposed behind and generally parallel to the elongate toolbars 168. The elongate frame members 180 and the elongate toolbars 168 are fixed together with struts 181 that extend fore-and-aft. The struts 181 are fixed at their front ends to the elongate toolbars 168 and at their rear ends to the elongate frame members 180. The struts 181 hold the elongate toolbars 168 and the elongate frame members 130 in fixed positions with respect to each other.

The left frame section 110 and the center frame section 112 also include elongate upper frame members 182 disposed along the top portion of corn head 100.

The left frame section 110 and the center frame section 112 also include vertical frame members 184 that extend between and are fixed to their respective elongate frame members 180 and elongate upper frame members 182.

A forward hinge 186 is fixed to and extends between adjacent ends of the elongate toolbars 168 on the left frame section 110 and the center frame section 112. A rear hinge 188 is fixed to and between adjacent ends of elongate frame members 180 on the left frame section 110 and the center frame section 112. The forward hinge 186 and the rear hinge 188 define the pivot axis 116 between the left frame section 110 and the center frame section 112.

The hinges are located relative to each other such that the pivot axis 116 extends for-and-aft and generally horizontally. While the pivot axis 116 is generally horizontal, it does have a slightly downward slope as it extends forward. The pivot axis 116 passes between the two adjacent row units 101 (identified as row unit 101A and row unit 101B) that are disposed on the right end of the left frame section 110 and the left end of the center frame section 112, respectively.

The row unit 101A is fixed to the elongate toolbar 168 of the left frame section 110. Row unit 101B is fixed to the elongate toolbar 168 of the center frame section 112.

As the left frame section 110 and the center frame section 112 pivot with respect to each other, the row unit 101A and the row unit 101B (which are disposed slightly above the elongate toolbars 168) will also move with respect to each other. The upper rear portions of the row units 101A and 101B will move closer together as the left frame section 110 pivots upward with respect to the center section, and will move farther apart as the left frame section 110 pivots downward with respect to the center frame section 112. For this reason, the point 106 and the cover 108 that bridge the gap between the left frame section 110 and the center frame section 112 are spring mounted.

Figure 4B:
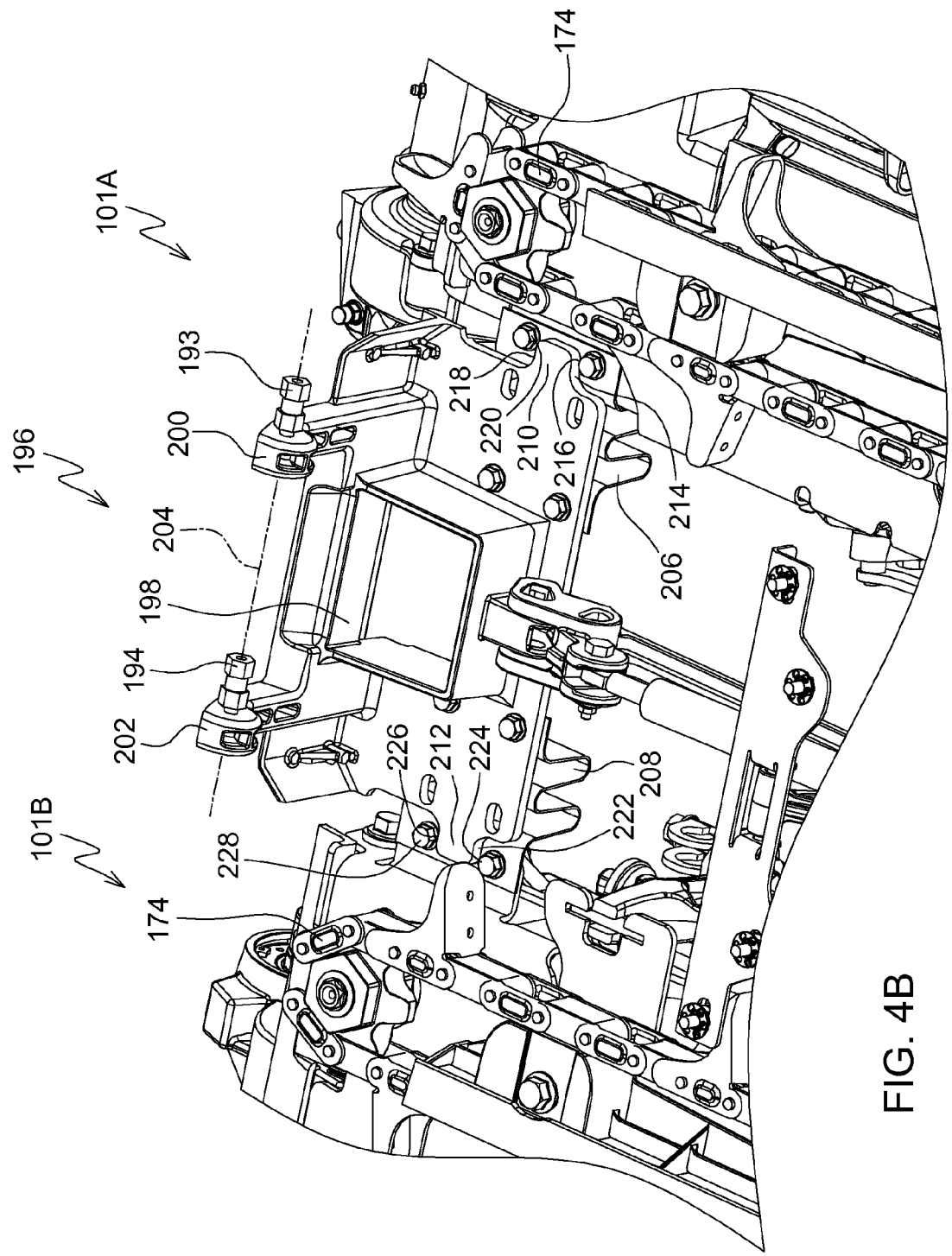
FIG. 4B is a detailed close-up view of the hinge of FIG. 4A that supports the point and cover.

In FIGS. 4A and 4B a point 106 covers a gap between two adjacent ones of the row units 101A and 101B, and hence covers a gap between the left frame section 110 and the center frame section 112. A cover 108 (not shown in FIGS. 4A and 4B, but shown in FIGS. 1, 2, 3, and 7, also covers the gap between the two row units 101A and 101B and hints covers a gap between the left frame section 110 and the center frame section 112.

The cover 108 (shown in FIGS. 1, 2, 3, and 7) that would normally be disposed immediately behind the point 106 has been removed in FIGS. 4A and 4B for purposes of illustration, in order to show the structures for maintaining the proper alignment of the point 106 and the cover 108 over the gap between the two row units 101A and 101B. The point 106 is pivotally connected to the cover 108 at two pivot points 190, 192 disposed on either side of the point 106. This permits the point 106 to pivot up and down with respect to the cover 108. The cover 108 is fixed to pivot pins 193, 194 that are disposed at the back of the row units 101A, 101B. Pivot pins 193, 194 are embedded in the plastic matrix of the cover 108, and are pivotally coupled to hinge 196. Hinge 196 comprises a base member 198 that extends laterally between the two adjacent row units 101A and 101B. Two vertical members 200, 202 extend upward from this base member 198. The upper ends of vertical members 200, 202 are pivotally coupled to pivot pins 193, 194. This hinge arrangement constrains the cover 108 to pivot with respect to the row units 101A, 101B about an axis 204 which extends laterally and generally parallel to the elongate toolbars 168 and to the longitudinal extent of the corn head 100.

In order to permit the row units 101A, 101B to move closer together and farther apart as the left frame section 110 pivots up and down with respect to the center frame section 112, a left spring 206, and a right spring 208 are coupled to the left side in the right side of the base member 198 of the hinge 196. The left spring 206 is also fixed to the right side of the row unit 101A. The right spring 208 is also fixed to the left side of row unit 101B. In this manner, the hinge 196 is supported on both row units and extends across the gap between the left frame section 110 and the center frame section 112.

The left spring 206 and the right spring 208 are extension springs. They are made of a thin, flexible, flat plate that is formed into a serpentine such that the springs can be extended and retracted in a direction generally parallel to the longitudinal extent of the elongate toolbars 168. The left spring 206 and the right spring 208 are substantially the same, and have the same spring constant. Therefore, when the two adjacent row units 101A, 101B separate from each other or move closer together, the left spring 206 and the right spring 208 cause the hinge to self-center between the two adjacent row units 101A, 101B. The left spring 206 and the right spring 208 could be compression springs or extension springs.

The cover 108 self-centers because the force the springs apply to adjacent ones of the row units 101A, 101B and to the cover 108 is causes the hinge 196 to move to a position between the two row units 101A, 101B in which the tension in each spring is equal 9 i.e. there is no net force pulling the hinge 196 to one side or another. Since the spring constants of each spring are the same this automatically moves the hinge 196 to a position right in the center of the two row units no matter what their relative spacing is.

The serpentine form of the left spring 206 and the right spring 208 provides additional benefits. They substantially eliminate any fore-and-aft movement of the point 106 and the cover 108. Furthermore they substantially eliminate rotation of the point 106 and cover about a vertical axis. This helps prevent the point 106 from being deflected side to side.

By themselves, the left spring 206 and the right spring 208 do not substantially prevent movement of the hinge 196 up and down with respect to the two row units, however. For this reason, portions of the base member 198 of hinge 196 extend on top of the adjacent row units 101A, 101B. These portions of the base member 198 are shown here as the left tab 210 and the right tab 212. These two tabs are disposed above structural members of the two row units. They are positioned so that the weight of the hinge 196, and hence at least a portion of the weight of the cover 108 rest upon the adjacent row units. In this manner, the hinges are not under a constant stress due to supporting the entire weight of the hinge 196 and the cover 108.

The left tab 210 and the right tab 212 are not fixed rigidly to the row units. Instead, the left tab 210 and the right tab 212 extend laterally away from opposite sides of base member 198 and extend over the top of the surface of the adjacent row units to rest thereon.

The left tab 210 and the right tab 212 are constrained to assist in preventing the point 106 from being deflected side to side as it engages crop. The left tab 210 and the right tab 212 function as guide members that slide laterally with respect to the two adjacent row units between surfaces on each side of the row unit that constrain the tabs from translating fore-and-aft with respect to the row units. The left tab 210 has a forward facing surface 214 that is immediately adjacent to a rearward facing surface 216 of row unit 101A. The left tab 210 has a rearward facing surface 218 that is immediately adjacent to a forward facing surface 220 of row unit 101A. The right tab 212 has a forward facing surface 222 that is immediately adjacent to a rearward facing surface 224 of row unit 101B. The right tab 212 has a rearward facing surface 226 that is immediately adjacent to forward facing surface 228 of row unit 101B. These surfaces constrain the base member 198 to side-to-side (i.e. lateral) movement, and prevent it from rotating about a generally vertical axis, at least as long as the tabs are resting on the surface of the adjacent row units and are therefore disposed between the forward and rearward facing surfaces of the row units.

When the point 106 is deflected side to side, the left spring 206 and the right spring 208 will resist this deflection. The adjacent surfaces described above on the row units 101A, 101B and on the left tab 210 and the right tab 212 also resist or prevent this lateral movement by engaging each other end whenever the deflection force tries to twist the point 106 to one side or the other.

Figure 5:
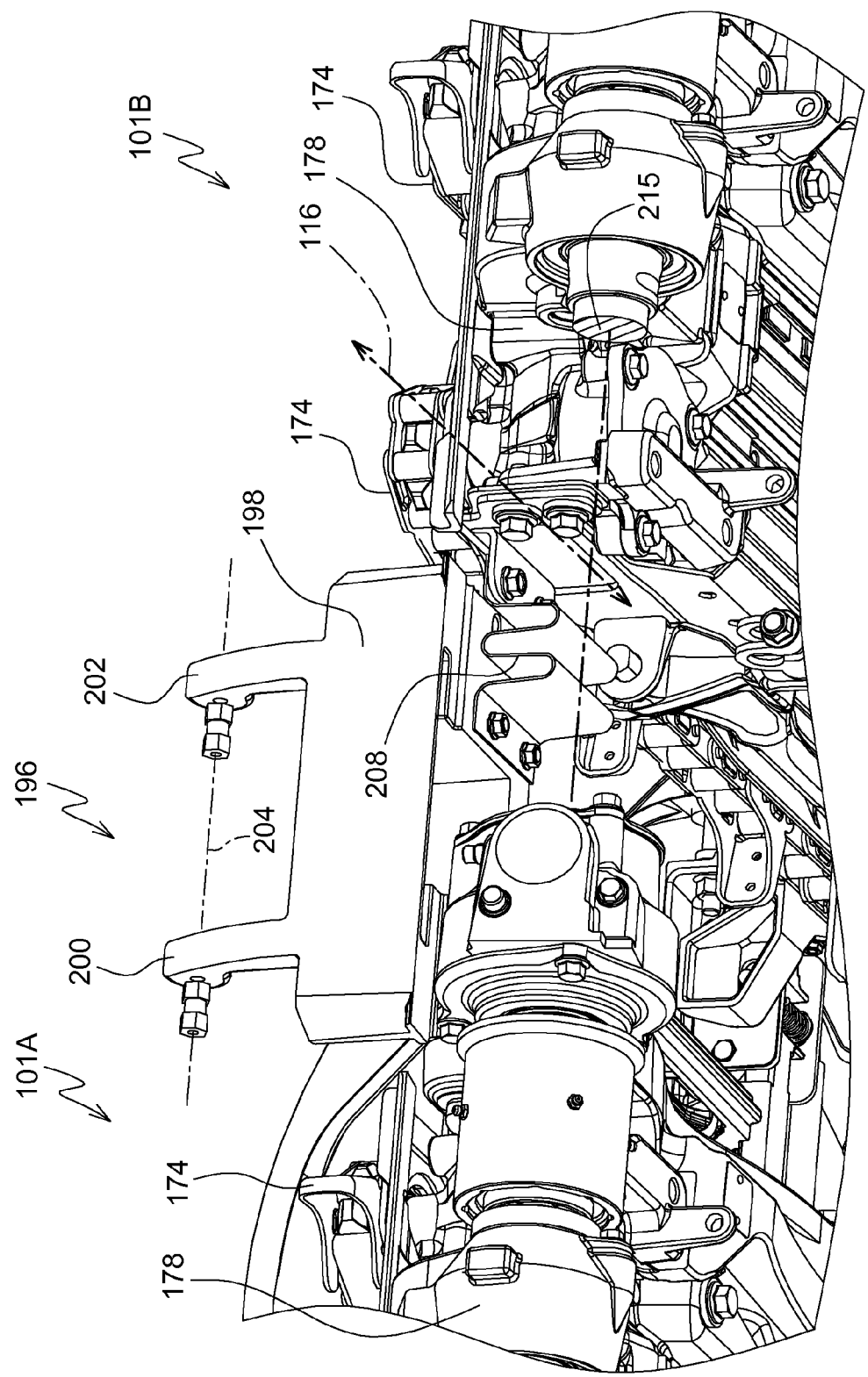
FIG. 5 is a depressed left side rear perspective view of the two row units and point of FIGS. 4A and 4B.
Figure 6:
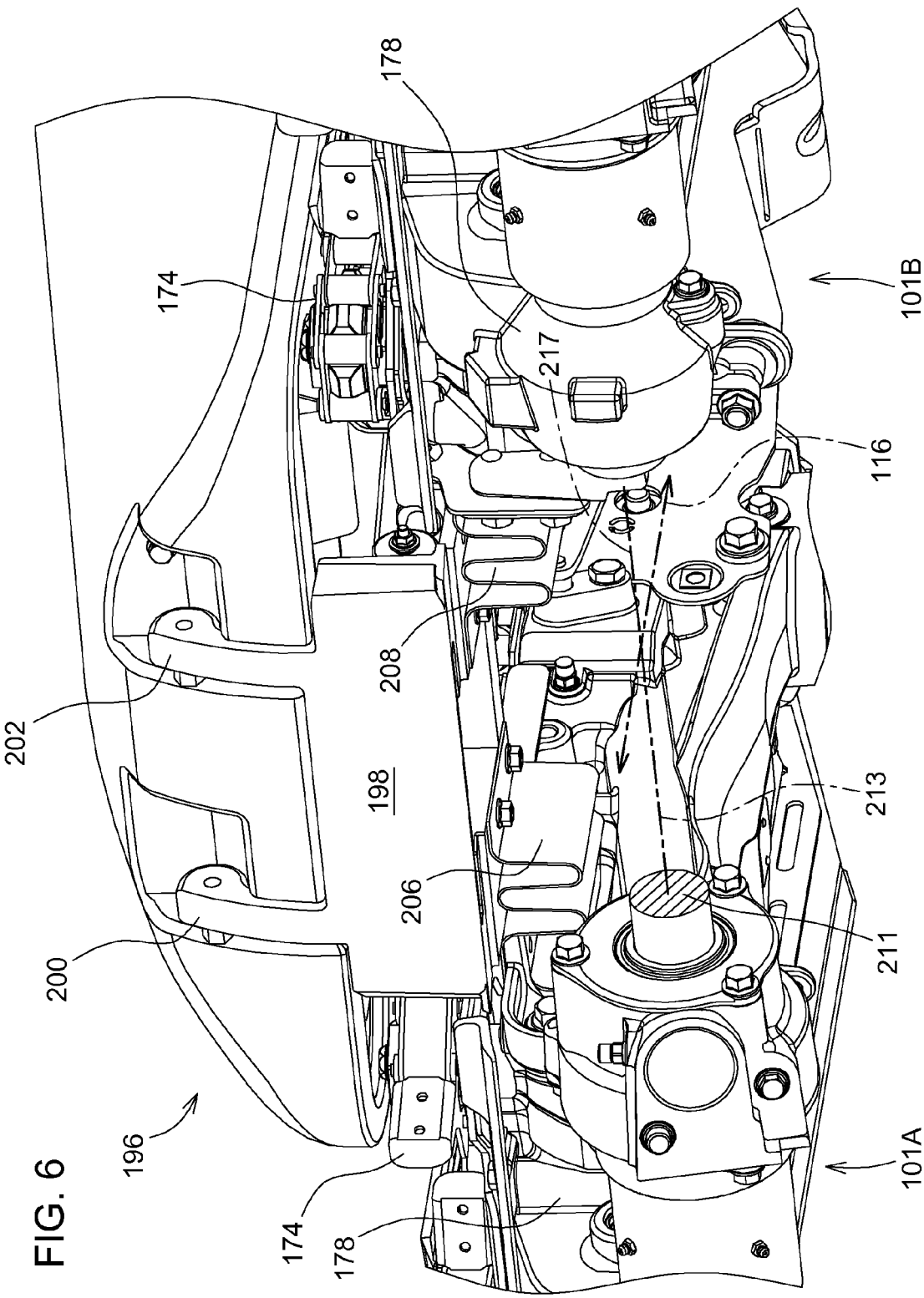
FIG. 6 is a slightly depressed right side rear perspective view of the two row units and point of FIGS. 4A, 4B and 5.
Figure 7:
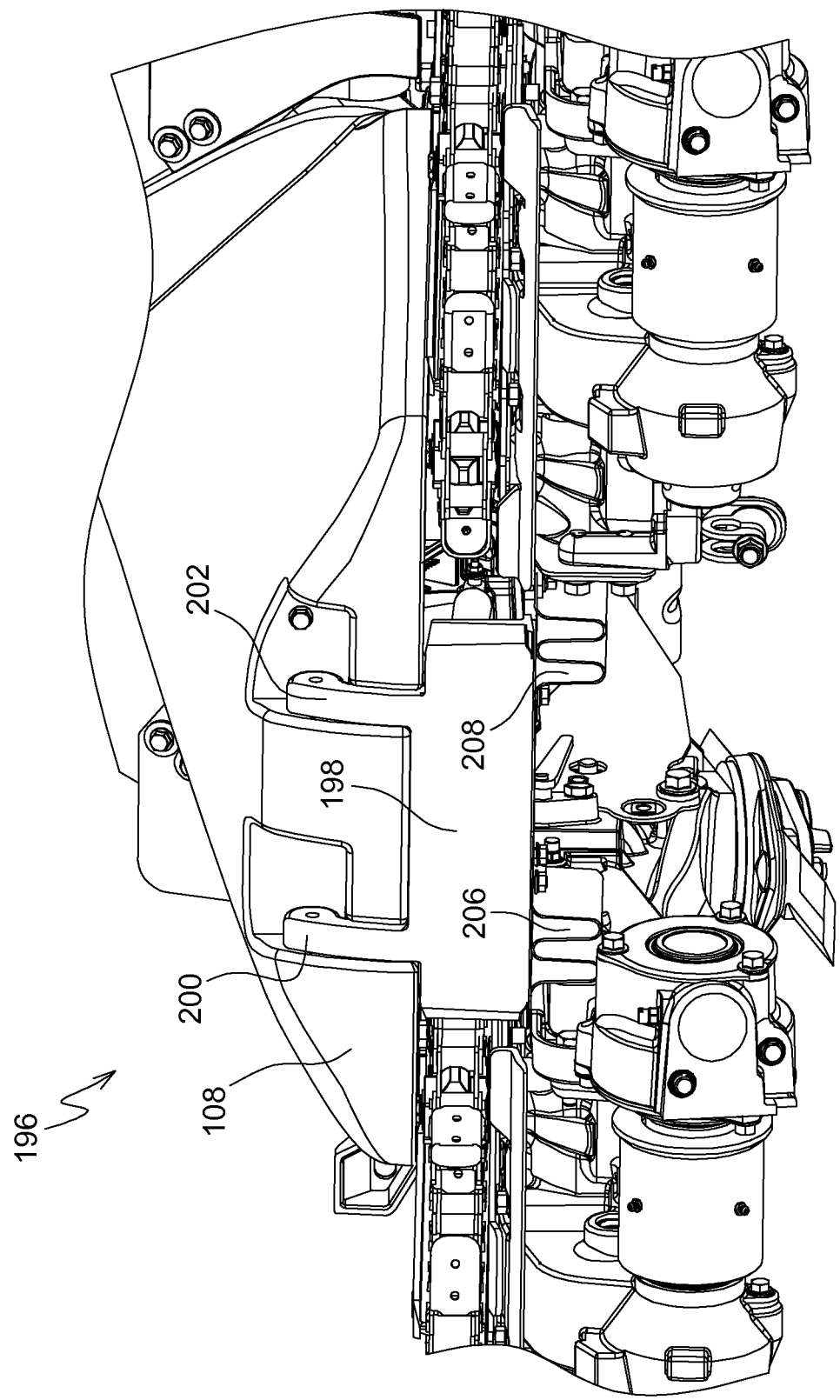
FIG. 7 is a fragmentary right side rear perspective view of the two row units in point of FIGS. 4A, 4B, 5, and 6 with the cover added.

FIGS. 5 and 6 illustrate the rear of the row units 101A and 101B that are supported on the left frame section 110 and the center frame section 112, respectively. The row unit 101A is driven by a drive shaft 211 that is shown in FIG. 6 extending slightly out of the row unit gearbox 178 of the row unit 101A. The drive shaft 211 has a rotational axis 213 that extends longitudinally. Row unit 101B is driven by drive shaft 215, which is shown extending slightly out of the row unit gearbox 178 of the row unit 101B. Drive shaft 215 has a rotational axis 217 that extends longitudinally.

All the row units 101 on the left frame section 110 are driven by drive shaft 211, which extends in a straight line through each of the row units. All the row units 101 on the center frame section 110 are driven by drive shaft 215, which extends in a straight line through each of the row units. Both drive shafts have a non-circular, regular polygonal outer surface, preferably a regular hexagon or octagon in cross section.

The two drive shafts 211, 215, if extended along their respective rotational axes 213, 217, will intersect each other in the space between the row units 101A and 101B in all possible pivotal positions achievable by the left frame section 110 with respect to the center frame section 112.

Figure 19:
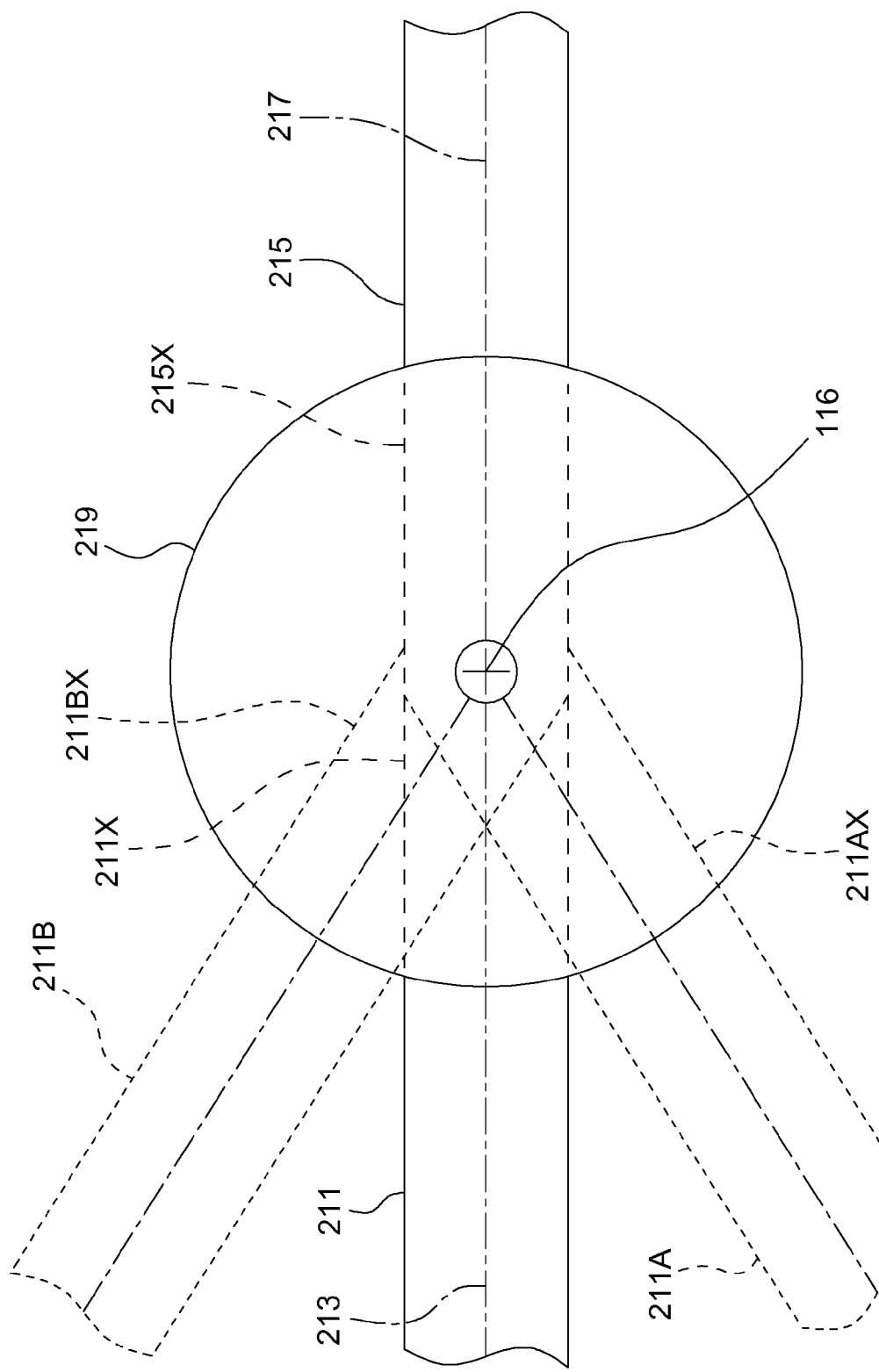
FIG. 19 is a schematic view of a universal joint that couples drive shafts driving row units in the left frame section and row units in the center frame section.

Furthermore, both drive shafts will intersect the pivot axis 116. In a preferred embodiment, the rotational axis 213 and the rotational axis 217 both intersect the pivot axis 116. This has the advantage of permitting both drive shafts to be coupled together with a universal joint 300 (FIG. 19). In FIG. 19, this relationship is illustrated in an alternative embodiment that shows a universal joint 219 coupling drive shafts 211 and 215. In FIG. 19, rotational axis 213 and the rotational axis 217 both intersect the pivot axis 116. Furthermore, the projected envelope 211X of drive shaft 211 intersects the projected envelope 215X of drive shaft 215. The envelopes of the drive shafts are projected parallel to the rotational axis 213 and the rotational axis 217.

When the left frame section 110 pivots upward with respect to the center frame section 112, drive shaft 211 assumes the position 211B. When the left frame section 110 pivots downward with respect to the center frame section 112, drive shaft 211 assumes the position 211A. In each of these alternative positions of drive shaft 211, and in all of the intermediate positions for lesser pivoting of drive shaft 211, the rotational axis 213 will intersect the rotational axis 217 at the pivot axis 116. Furthermore, the projected envelopes 215X of the drive shaft 215 and the projected envelope 211BX of drive shaft 211 in the position 211B and the projected envelope 211AX of drive shaft 211 in the position 211A will intersect each other and will intersect the pivot axis 116.

With the drive shafts 211, 215 so arranged to intersect the pivot axis 116, the axial loads on the universal joint 219 will be minimized throughout the entire range of pivotal movement of the left frame section 110 with respect to the center frame section 112.

Figure 8:
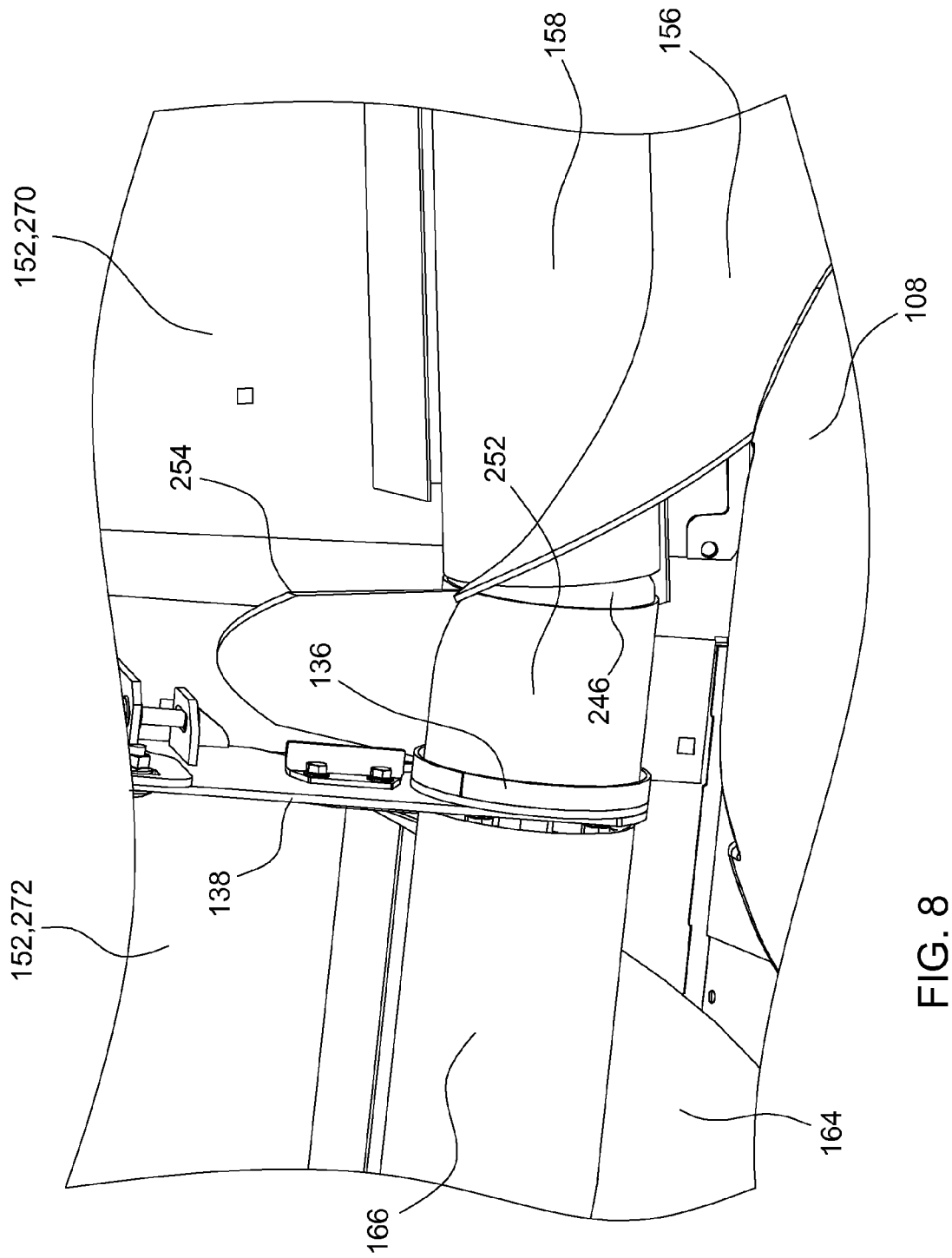
FIG. 8 is an elevated left side perspective view of the corn head of FIG. 1, showing details of the left side auger joint and the cover of FIG. 7.
Figure 9:
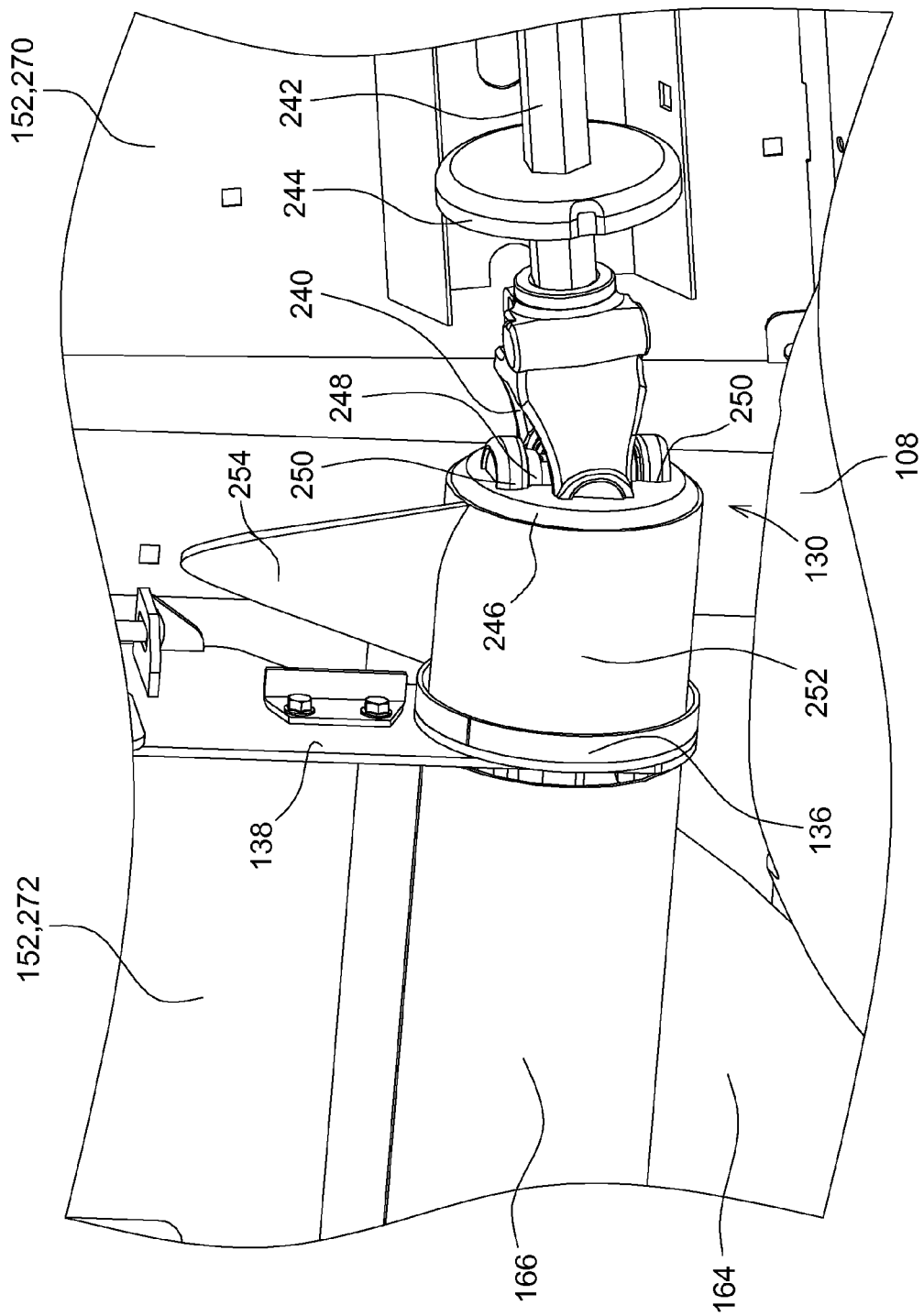
FIG. 9 is a fragmentary elevated left side perspective view of the arrangement of FIG. 8 with the auger tube of the left side auger to illustrate its internal construction.
Figure 10:
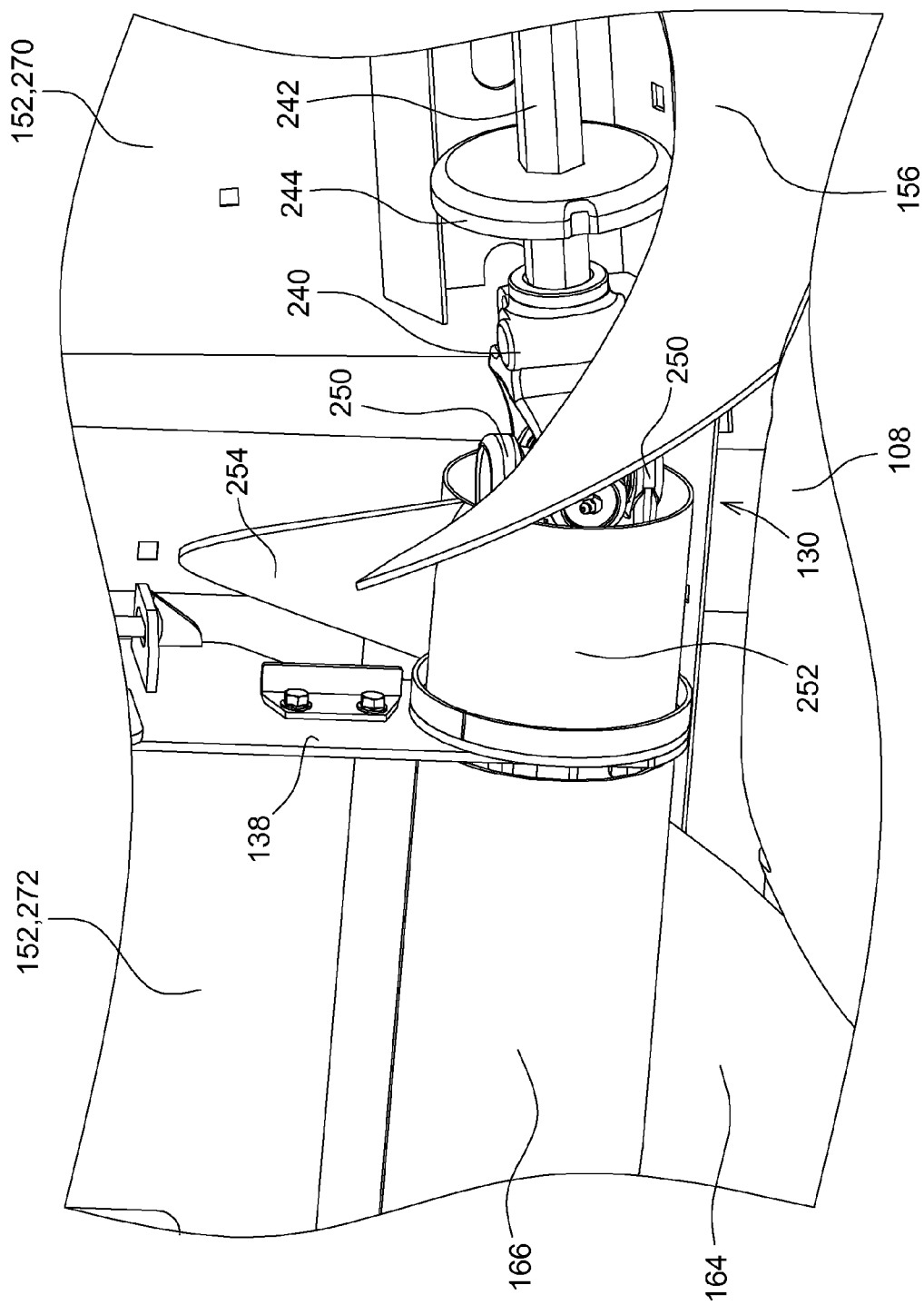
FIG. 10 is the view of FIG. 9 with a trash seal removed.
Figure 11:
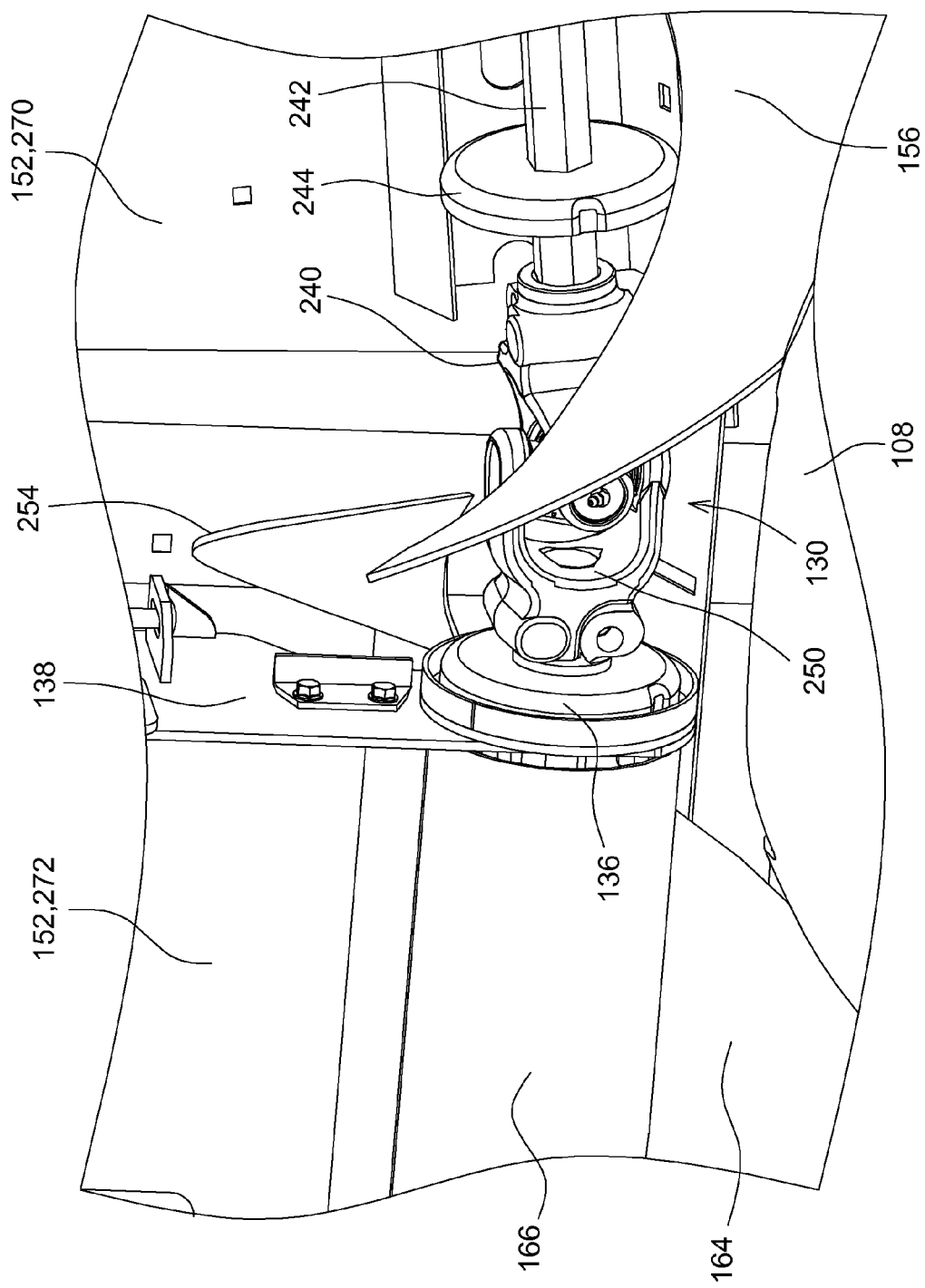
FIG. 11 is the view of FIG. 10 with a stub auger tube removed.

FIGS. 8-12 illustrate an arrangement for coupling the left and center conveyor sections together. FIG. 8 shows the complete assembly of the left conveyor section 120 and the center conveyor section 122. In FIG. 9, the elongate tube 158 for the left conveyor section 120 has been removed, exposing a first yoke 240 of the universal joint 130. The first yoke 240 is supported on a shaft 242 that in turn is fixed to a plurality of spaced apart circular disks 244. Circular disks 244 are welded to the inside surface of the elongate tube 158. In this manner, the first yoke 240 is fixed to the elongate tube 158 and is disposed substantially entirely inside the end of the elongate tube 158. The free (right) end of the elongate tube 158 is disposed immediately adjacent to a seal 246.

Seal 246 has an outer diameter that is substantially the same size as the outer diameter of the elongate tube 158. It is slightly smaller than the elongate tube 158, and therefore the elongate tube 158 can extend closely around the outside of seal 246, as shown in FIG. 8. Seal 246 is generally disk shaped extends inwardly from its outer edge to an inner periphery that is disposed very closely to the contours of the first yoke 240 and the second yoke 250. The first yoke 240 is coupled to a cross-shaped connecting element 248 that forms a part of the universal joint 130, which in turn is coupled to the second yoke 250 that forms the final part of the universal joint 130. The inner periphery of seal 246 is spaced a small distance apart from the first yoke 240 and the second yoke 250 and the cross-shaped connecting element 248. The function of seal 246 is to prevent the plant matter being conveyed by the conveyor 104 from being jammed into the universal joint 130, damaging the bearing 136, and winding around the elongate tubes that form part of the conveyor 104. When this occurs, a mass of plant matter forms that effectively blocks the conveyor. The agricultural harvester must be stopped, the conveyor must be stopped, the operator must get out of the cab, climb down, and clear the plant matter wrapped around the conveyor 104. This can significantly delay harvesting.

Seal 246 is fixed to a stub tube 252 which surrounds the second yoke 250. The second yoke 250, in turn, is fixed to and rotates with the left end of the center conveyor section 122. The second yoke 250 is disposed on the left side of the bearing 136. It is spaced to the left (outer) side of the bearing 136 a distance roughly equal to the diameter of the elongate tube 158 and the elongate tube 166. This spacing provides a zone of separation between the bearing 136 and seal 246. The stub tube 252 has an outer diameter that is substantially equal to the outer diameter of the elongate tube 158.

This similarity in diameter permits plant material to slide smoothly from the elongate tube 158 to the stub tube 252, and thence past the bearing 136, to the elongate tube 166 of the center conveyor section 122, which also has an outer diameter that is substantially equal to the outer diameter of the elongate tube 158.

In FIG. 8, the auger flight 156 of the left conveyor section 120 is shown extending axially inwardly past the end of the elongate tube 158 and over the top of the stub tube 252. In an alternative and preferred embodiment, the auger flight 156 can be terminated at the end of the elongate tube 158. This shortened length of the auger flight 156 is shown as a dashed line in FIG. 8.

The stub tube 252 has its own auger flight 254. The auger flight 254 is angularly disposed between 5 and 30 degrees behind the auger flight 156 of the left conveyor section 120 as the tubes rotate. This reduces the possibility that material will become trapped between the two flights and wrap around the elongate tube 158 and the elongate tube 166. Stub tube 252 terminates at the bracket 138.

Since the bearing 136 is spaced away from the second yoke 250 of the universal joint 130, the auger flight 254 at the end of the center conveyor section 122 can be disposed immediately adjacent to the auger flight 156 at the end of the left conveyor section 120. The auger flight 254 and the auger flight 156 can be so close they overlap each other when the left frame section 110 is pivoted up and down with respect to the center frame section 112. By providing an auger flight 254 on a stub portion of the center conveyor section 122 the universal joint 130 can be cantilevered out away from the bracket 138 and the flight-to-flight spacing of the two conveyor. sections made smaller. This is enhanced by locating the end of the auger flight 254 angularly away from the adjacent end of the auger flight 156, which prevents the flights from physically interfering with each other even when they overlap during times of extreme pivoting of one frame with respect to the other.

Figure 12:
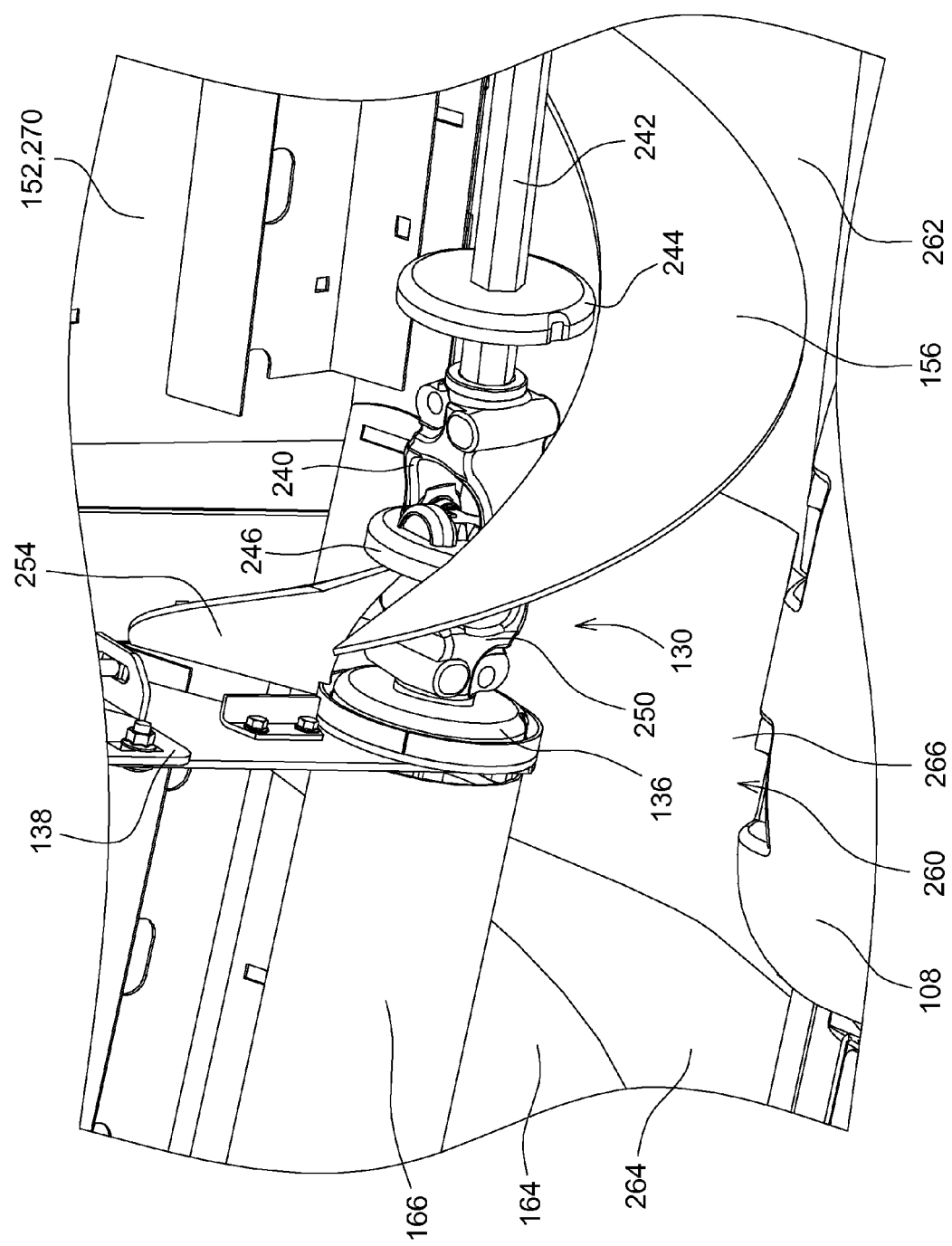
FIG. 12 is of FIG. 11 taken at a slightly elevated angle to show the joint between adjacent auger troughs.

FIGS. 12-15 illustrate two further features of the corn head 100. Each section of the auger rotates above a trough formed by a long concave sheet metal form. The auger troughs are supported on the frames of each frame section. Just as the auger has joints that permit the auger to pivot when the frame members are pivoted with respect to each other, so also the trough has a pivot joint 260 as well. The pivot joint 260, as best shown in FIG. 12, is disposed immediately below the universal joint 130. The pivot joint 260 is disposed between the universal joint 130 and the pivot axis 116.

Figure 13:
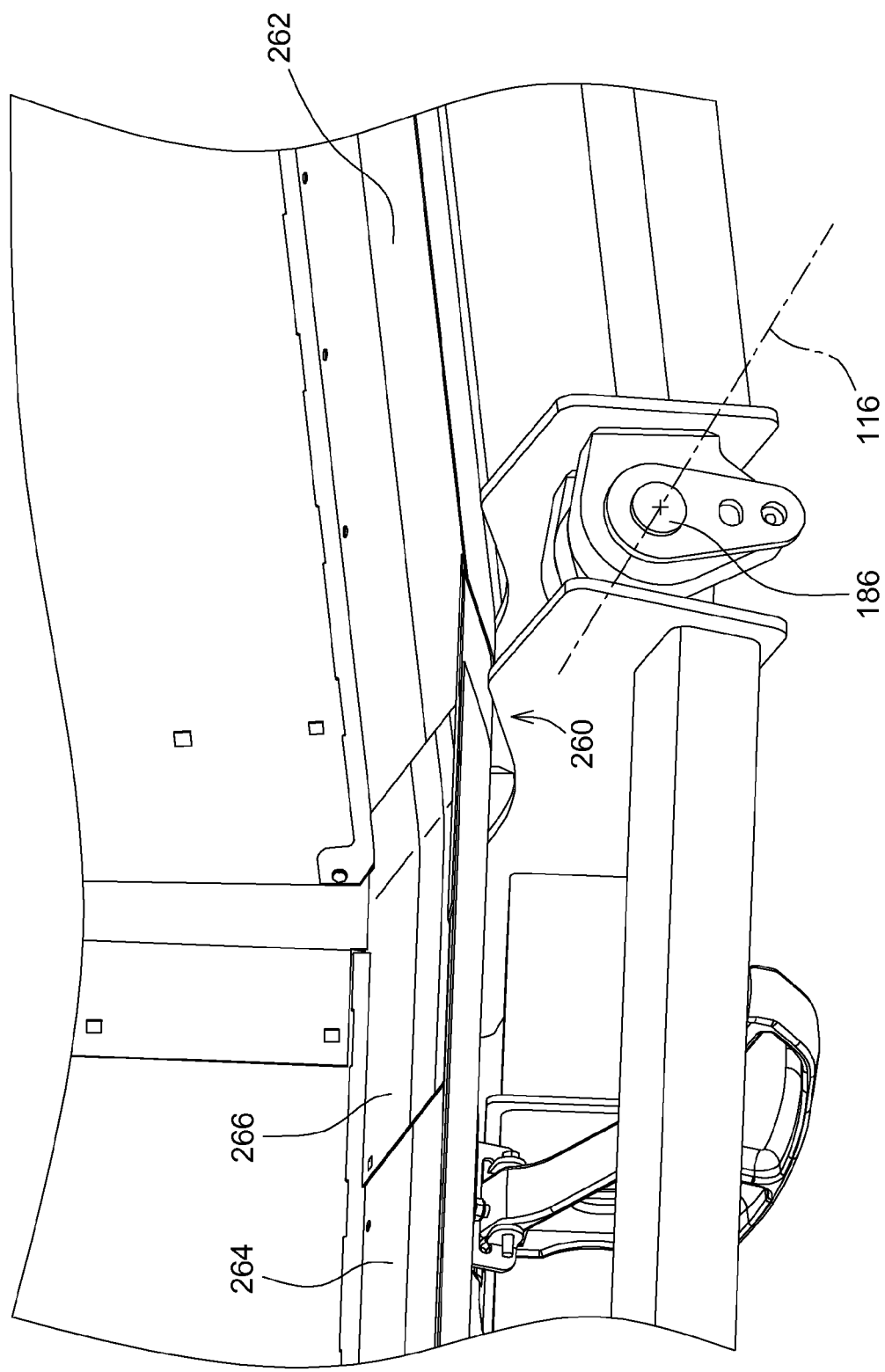
FIG. 13 is a fragmentary elevated right side perspective view of the auger trough of FIG. 12 with the auger removed.

As best shown in FIG. 13, the pivot joint 260 is also disposed immediately above the pivot axis 116 and lies in the same vertical plane as the pivot axis 116. The pivot joint 260 forms a junction between a left auger trough 262 disposed underneath the left conveyor section 120, and a center auger trough 264 disposed underneath the center conveyor section 122.

The left auger trough 262 extends substantially the entire length of the left frame section 110 underneath the left conveyor section 120. The center auger trough 264 extends substantially the entire length of the center frame section 112 underneath the center conveyor section 122.

The left end of the center auger trough 264 is disposed such that it extends underneath the right end of the left auger trough 262. In the arrangement shown herein, an auger trough extension 266 is removably fixed to the left end portion of the center auger trough 264 and extends farther to the left and underneath the left auger trough 262. The auger trough extension 266 is preferably made out of a flexible, wear resistant material. Its short length makes it easier to remove in the case of wear. The overlapping of the left auger trough 262 on top of the center auger trough 264 (including on top of the auger trough extension 266 of the center auger trough 264) ensures that crop pulled leftward toward the center of the corn head 100 will slide easily over these shingled auger troughs. In the preferred arrangement, the left auger trough 262 and the center auger trough 264 (including the auger trough extension 266) preferably are in sliding contact with each other, or, if not in sliding contact, are spaced apart a distance of no more than about 5 mm over the width of the troughs.

Figure 14:
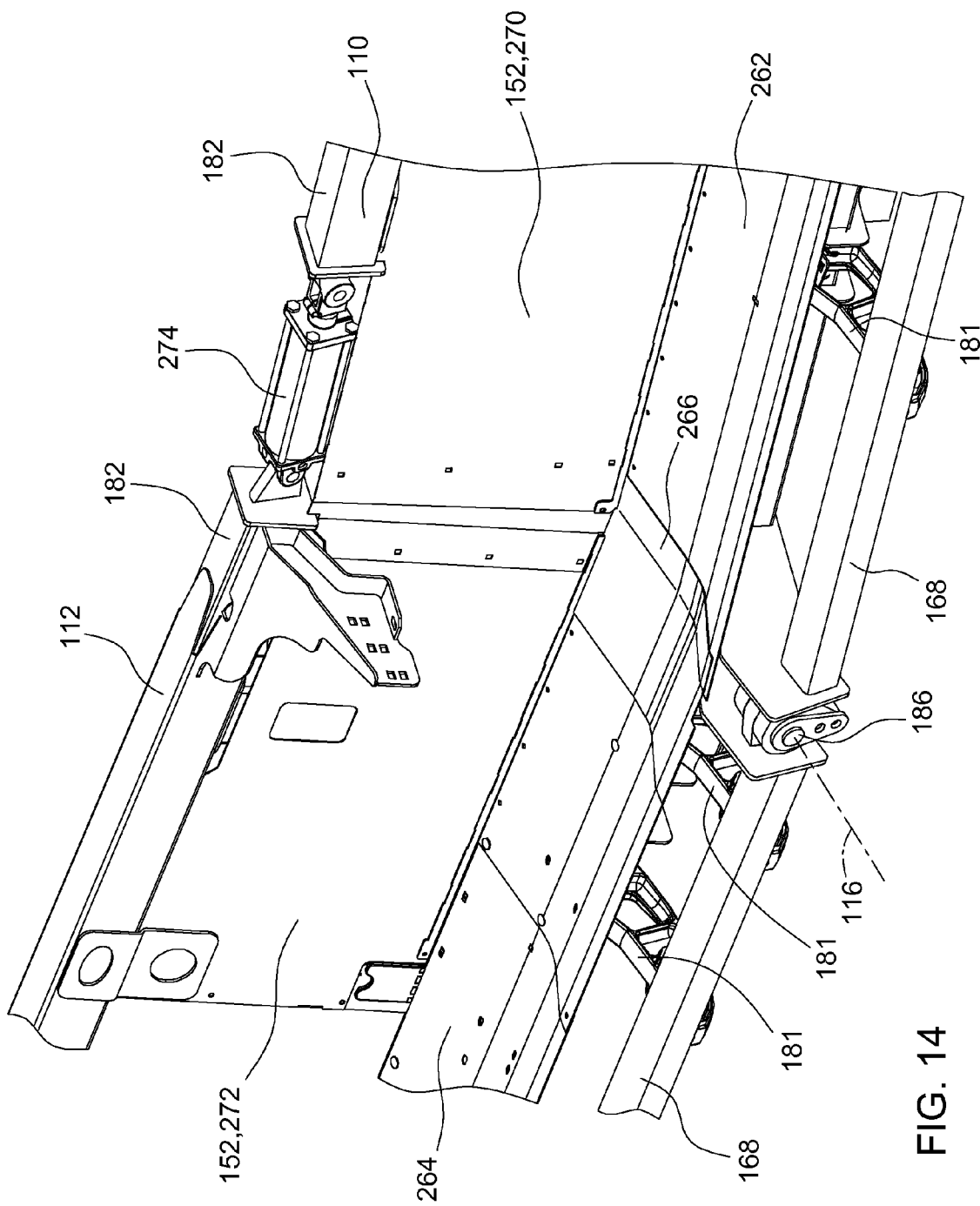
FIG. 14 is a view of the auger troughs and the back walls with the auger removed taken from approximately the same perspective as FIG. 12.
Figure 15:
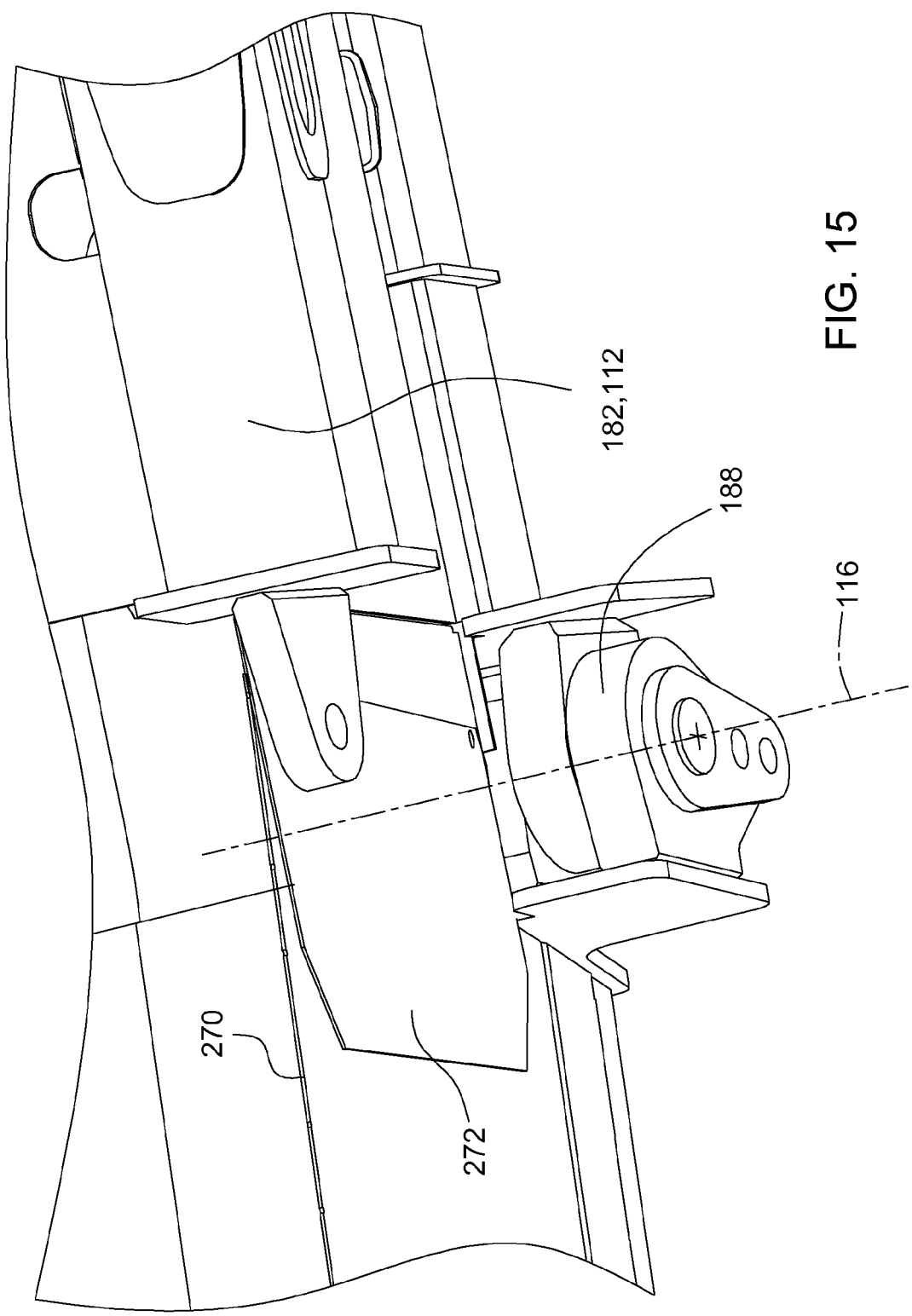
FIG. 15 is a highly elevated left side rear view of the corn head of FIGS. 13 and 14 showing the sliding rear wall joint and the rear hinge coupling the left frame section and the center frame section with a hydraulic cylinder and an upper elongate member of the frame of the left frame section removed for ease of illustration.

FIGS. 14 and 15 illustrate a similar overlapping arrangement that joins the left frame section back wall 270 to the center frame section back wall 272. The back walls 270, 272 are generally vertical sheets of metal fixed to the frame 102. The back walls form a barrier to prevent crop from being pushed through the back of the corn head 100 when the conveyor 104 rotates.

In the illustrated arrangement, the left frame section back wall 270 lies on top of (is forward of) the center frame section back wall 272 where the two overlap.

When a hydraulic cylinder 274 extends and retracts, it causes the elongate upper frame member 182 of the left frame section 110 and the elongate upper frame member 182 of the center frame section 112 to be drawn toward each other or pulled away from each other. This causes the left frame section 110 to pivot up and down with respect to the right frame section 112. It also causes the center frame section back wall 272 to slide with respect to the left frame section back wall 270. As with the auger trough arrangement, this overlapping of left back wall over center back wall ensures that crop flow will transition smoothly from the left frame section 110 to the center frame section 112 without getting caught.

In a preferred arrangement, the left frame section back wall and the center frame section back wall are in sliding contact with each other or, if not in sliding contact, are spaced apart a distance of no more than about 5 mm over the height of the back wall.

Figure 16:
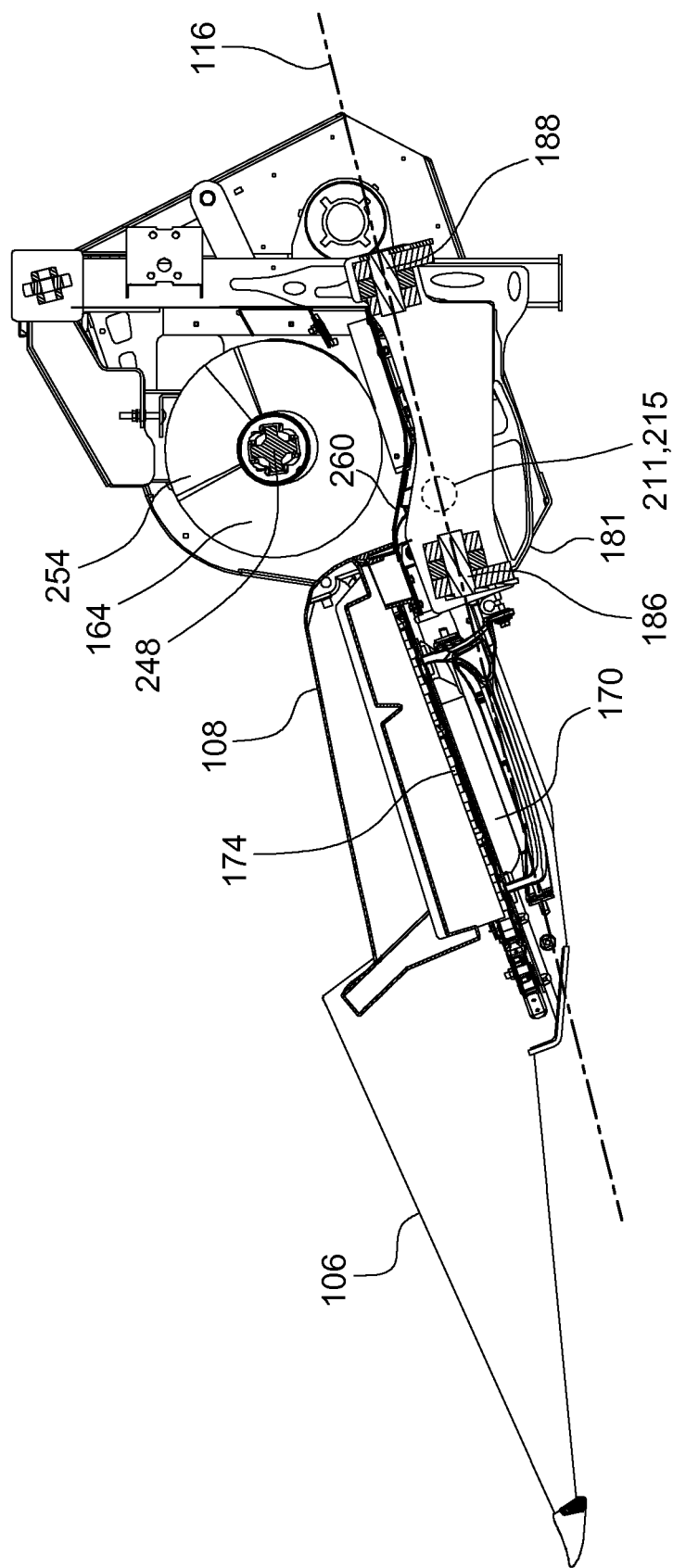
FIG. 16 is a cross sectional view of the corn head taken at section line A-A in FIG. 1. Section line A-A defines a cutting plane that extends both vertically and fore-and-aft and is normal to the longitudinal extent of the center frame section.
Figure 17:
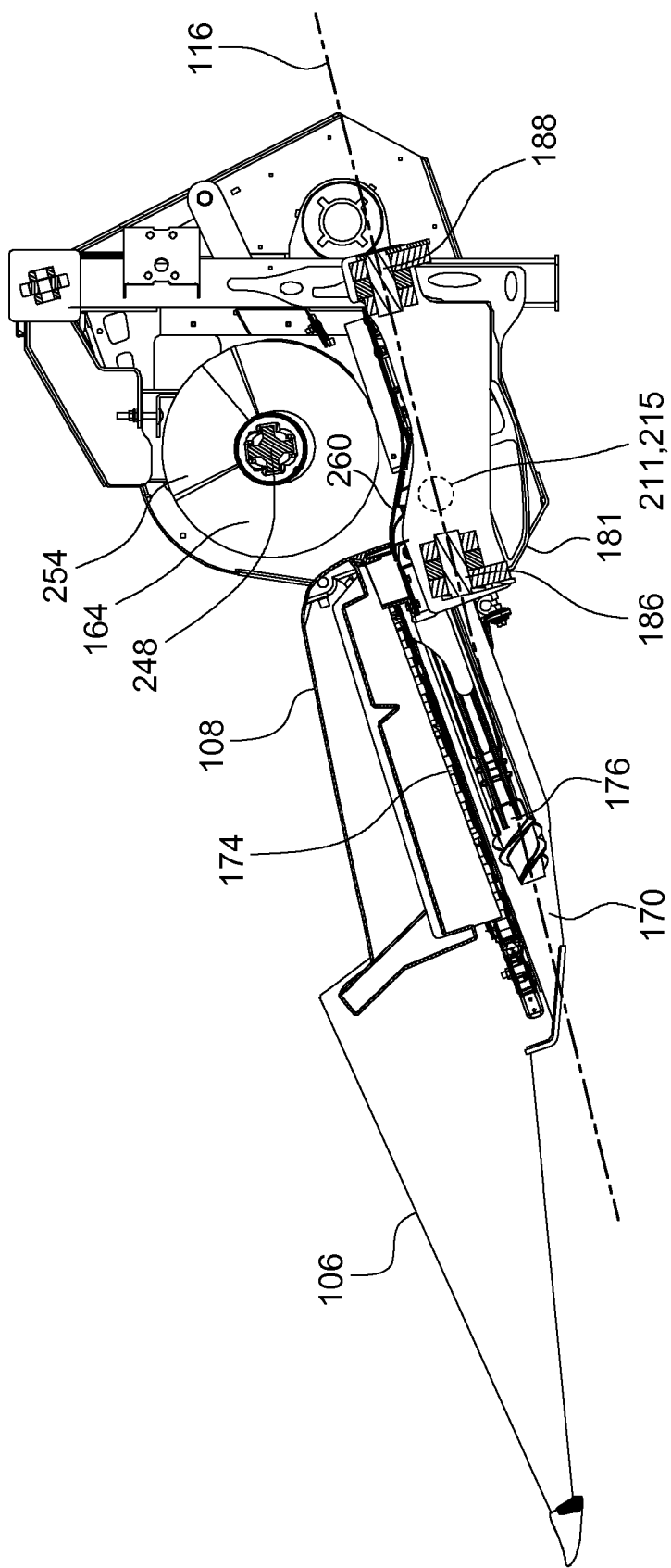
FIG. 17 is the view of FIG. 16 with a left side row unit arm removed to show a stalk roll of the row unit immediately adjacent to the pivot axis.
Figure 18:
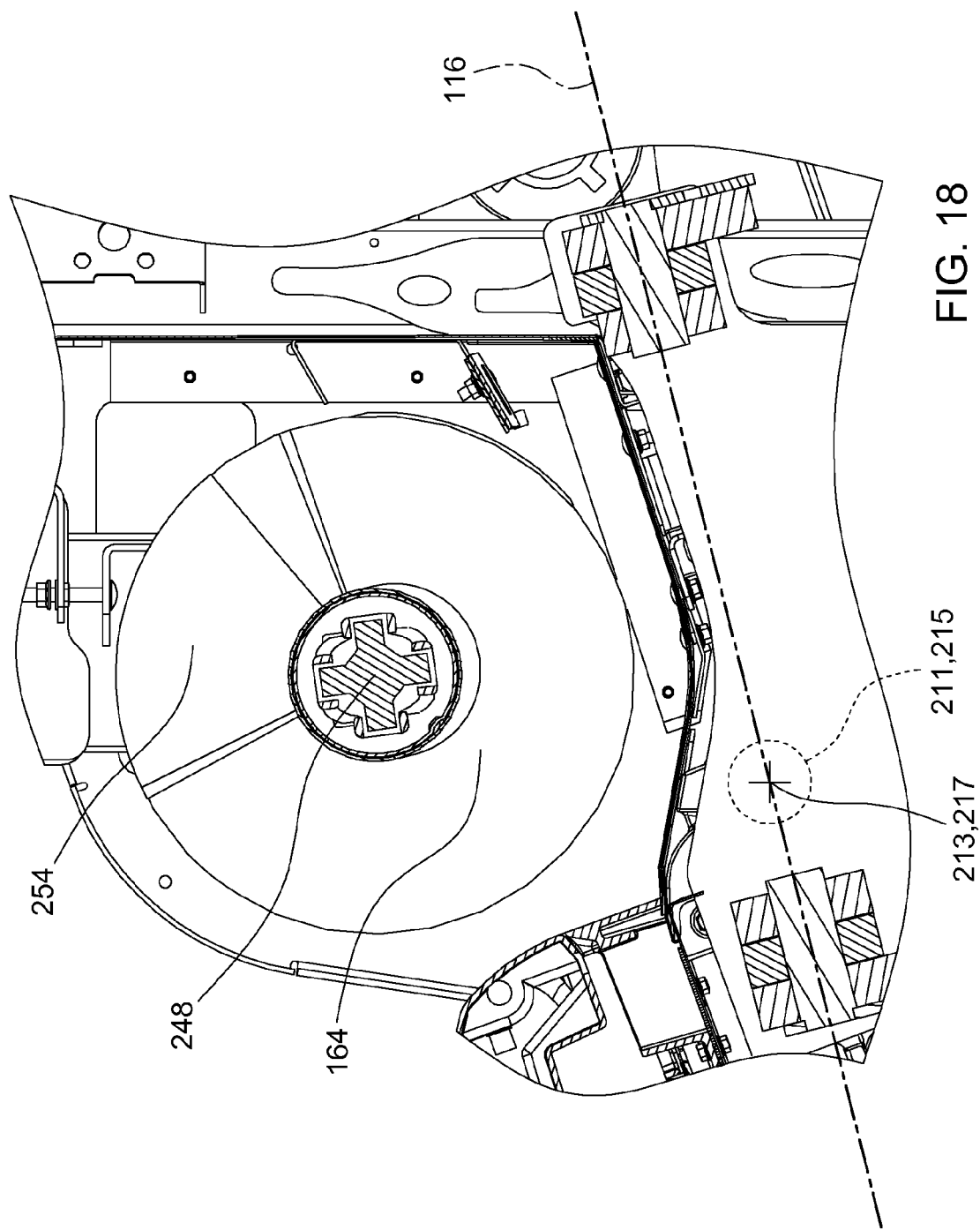
FIG. 18 is a detail of the view of FIGS. 16-17 showing the center auger and pivot joint between the left frame section and the center frame section.

FIGS. 16, 17 and 18, particularly illustrate the orientation and location of the forward hinge 186 and rear hinge 188. These figures are cross-sectional views taken by a cutting plane that extends both vertically and fore-and-aft. This cutting plane passes through the universal joint 130 and the forward hinge 186 and the rear hinge 188. The hinges define the pivot axis 116 about which the left frame section 110 pivots with respect to the center frame section 112.

The pivot axis 116 extends through pivot pins of the forward hinge 186 and the rear hinge 188, forward and downward. In the side view of FIGS. 16-18, the pivot axis 116 passes through a skid shoe 276 disposed on a forward end of arm 170. In the side view of FIGS. 16-18, the pivot axis 116 also passes through the stalk rolls 176.

What this location of the pivot axis 116 means from a kinematic perspective is that as the left frame section 110 pivots up and down with respect to the center frame section 112, the spacing between adjacent row units on the left frame section 110 and the center frame section 112 changes as little as possible for each pivot.

If the left frame section 110 was positioned in FIGS. 16-17 with a pivot angle of zero degrees with respect to the center frame section 112 (i.e. when the corn head 100 rests on flat ground), the pivot axis 116 would be located directly between the adjacent row units 101: between arms 170 of adjacent ones of the row units 101A, 101B, between the stalk rolls 176 of adjacent row units 101A, 101B, and between skid shoes of adjacent row units 101A, 101B.

Because of this spatial relationship, as the corn head 100 travels through the field, with the left frame section 110 pivoting up and down with respect to the right frame section 112, this pivoting does not substantially change the lateral spacing between the adjacent row units at the skid shoes and stalk rolls of those adjacent row units. Thus, as the left frame section 110 and the right frame section 114 pivot up and down, the relative spacing between adjacent row units does not change, but stays constant. This is important since adjacent rows of crops are planted with a constant relative spacing whether the terrain is rolling or flat. If (in an extreme example) the pivot axis 116 extended fore-and-aft but was 6 feet above the row units, the spacing between adjacent row units could change as much as 20-40 centimeters every time the left frame section 110 pivoted 10 degrees with respect to the center frame section 112. This sudden additional spacing between adjacent row units would cause a significant portion of the crop to be crushed rather than harvested as the points ran over rows of crop rather than feeding them between the stalk rolls.

The universal joint 130 also lies in the same vertically and fore-and-aft extending plane as the pivot axis 116. The universal joint 130 is therefore directly above the pivot axis 116.

The joint 160 defined between the left auger trough 262 and the center auger trough 264 intersects the same plane as the universal joint 130 and the pivot axis 116. Thus, portions of the left auger trough 262 and the center auger trough 264 pass through the vertical and fore-and-aft extending plane. The pivot axis 116 is directly below the joint 160. This close spacing of the auger troughs to the pivot axis 116 permits the pivot joint 260 to be made quite narrow and to seal well.

The invention claimed is:

1. A self-centering cover assembly for row units (101) of a hinged row crop harvesting head (100), the hinged row crop harvesting head (100) having a first frame section (110, 114) and a second frame section (112) pivotally coupled together, the self-centering cover assembly comprising:
a base member (198);
a cover (108) coupled to the base member (198);
a first spring (206, 208) coupled between the first frame section (110, 114) and the base member (198); and
a second spring (206, 208) coupled between the second frame section (112) and the base member (198);
wherein the first spring (206, 208) and the second spring (206, 208) are disposed to reposition the cover (108) with respect to both the first frame section (110, 114) and the second frame section (112) when the first frame section (110, 114) and the second frame section (112) pivot with respect to each other.

2. The self-centering cover assembly of claim 1, wherein the first spring (206, 208) is coupled to a first row unit (101) on the first frame section (110, 114), and wherein the second spring (206, 208) is coupled to a second row unit (101) immediately adjacent to the first row unit (101), and wherein the second row unit (101) is mounted on the second frame section (112).

3. The self-centering cover assembly of claim 1, wherein the base member (198) further comprises guide members (210, 212) that constrain the base member (198) to slide laterally with respect to the first frame section (110, 114) and the second frame section (112) when the first frame section (110, 114) and the second frame section (112) pivot with respect to each other.

4. The self-centering cover assembly of claim 3, the guide members (210, 212) are disposed on opposite sides of the base member (198).

5. The self-centering cover assembly of claim 1, wherein the first spring (206, 208) and the second spring (206, 208) are serpentine.

6. The self-centering cover assembly of claim 1, wherein the first spring (206, 208) and the second spring (206, 208) are disposed to extend and retract in a direction generally parallel to a longitudinal extent of the hinged row crop harvesting head (100).

7. The self-centering cover assembly of claim 1, wherein the first spring (206, 208) and the second spring (206, 208) are fixed to opposite lateral sides of the base member (198).

8. The self-centering cover assembly of claim 1, wherein the base member (198) is coupled to the cover (108) by a hinge (196), wherein the hinge (196) constrains the cover (108) to pivot with respect to the base member (196) about a laterally extending axis (204).

9. The self-centering cover assembly of claim 8, wherein the hinge (196) is disposed above the first spring (206, 208) and the second spring (206, 208).

10. The self-centering cover assembly of claim 9, wherein the hinge (196) is disposed behind the first spring (206, 208) and the second spring (206, 208).

11. The self-centering cover assembly of claim 1, wherein the base member (198) is disposed immediately above a pivot axis (116, 118) about which pivot axis the first frame section (110, 114) is constrained to pivot with respect to the second frame section (112).

12. The self-centering cover assembly of claim 11, wherein the first spring (206, 208) is disposed on one side of the pivot axis (116, 118), and wherein the second spring (206, 208) is disposed on the other side of the pivot axis (116, 118).

13. The self-centering cover assembly of claim 12, wherein the first spring (206, 208) and the second spring (206, 208) are disposed above the pivot axis (116, 118).

* * * * *